(12) United States Patent
Ohishi et al.

(10) Patent No.: US 9,833,972 B2
(45) Date of Patent: Dec. 5, 2017

(54) LAMINATED STEEL PLATE

(75) Inventors: Hiroshi Ohishi, Tokyo (JP); Atsuo Koga, Tokyo (JP); Hirokazu Taniguchi, Tokyo (JP); Hiroshi Ohashi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 1092 days.

(21) Appl. No.: 13/261,156

(22) PCT Filed: Jul. 28, 2010

(86) PCT No.: PCT/JP2010/062666
§ 371 (c)(1),
(2), (4) Date: Jan. 26, 2012

(87) PCT Pub. No.: WO2011/013691
PCT Pub. Date: Feb. 3, 2011

(65) Prior Publication Data
US 2012/0128926 A1 May 24, 2012

(30) Foreign Application Priority Data

Jul. 31, 2009 (JP) ................................ 2009-179851

(51) Int. Cl.
  B32B 15/01 (2006.01)
  B32B 5/28 (2006.01)
  (Continued)

(52) U.S. Cl.
  CPC .............. *B32B 15/011* (2013.01); *B32B 5/28* (2013.01); *B32B 15/02* (2013.01); *B32B 15/043* (2013.01);
  (Continued)

(58) Field of Classification Search
  CPC ..... B32B 15/011; B32B 15/02; B32B 15/043; B32B 15/046; B32B 15/06; B32B 15/08;
  (Continued)

(56) References Cited

U.S. PATENT DOCUMENTS 4,203,195 A   5/1980   Nakae et al.
4,313,996 A   2/1982   Newman et al.
(Continued)

FOREIGN PATENT DOCUMENTS

CA   2384078   3/2001
DE   3834205   6/1989
(Continued)

OTHER PUBLICATIONS

International Search Report dated Aug. 24, 2010, issued in corresponding PCT Application No. PCT/JP2010/062666.
(Continued)

*Primary Examiner* — Arti Singh-Pandey
(74) *Attorney, Agent, or Firm* — Birch, Stewart, Kolasch & Birch, LLP

(57) ABSTRACT

In a laminated steel plate in which steel plates are joined to both faces of a core layer, the core layer is formed of a meshed wire group formed using wires in a mesh form and a resin sheet, the wires forming the meshed wire group have a tensile strength of 601 MPa or higher, and an opening of the meshed wire group is equal to or less than ten times the thickness of the steel plates. By thus defining the tensile strength of the wires, light-weightness can be achieved compatibly with high rigidity and shock resistance, and by defining the opening of the meshed wire group, workability and shape stability after being processed can be improved.

13 Claims, 7 Drawing Sheets

(51) Int. Cl.
*B32B 15/02* (2006.01)
*B32B 15/04* (2006.01)
*B32B 15/06* (2006.01)
*B32B 15/08* (2006.01)
*B32B 15/18* (2006.01)

(52) U.S. Cl.
CPC ............. *B32B 15/046* (2013.01); *B32B 15/06* (2013.01); *B32B 15/08* (2013.01); *B32B 15/18* (2013.01); *B32B 2255/02* (2013.01); *B32B 2255/06* (2013.01); *B32B 2260/021* (2013.01); *B32B 2266/02* (2013.01); *B32B 2266/025* (2013.01); *B32B 2266/0214* (2013.01); *B32B 2266/0228* (2013.01); *B32B 2266/0235* (2013.01); *B32B 2266/0242* (2013.01); *B32B 2266/0257* (2013.01); *B32B 2266/0264* (2013.01); *B32B 2266/0271* (2013.01); *B32B 2266/0285* (2013.01); *B32B 2266/0292* (2013.01); *B32B 2266/104* (2016.11); *Y10T 428/24033* (2015.01); *Y10T 428/24107* (2015.01); *Y10T 442/10* (2015.04)

(58) Field of Classification Search
CPC . B32B 15/18; B32B 2255/02; B32B 2255/06; B32B 2260/021; B32B 2266/02; B32B 2266/0214; B32B 2266/0228; B32B 2266/0235; B32B 2266/0242; B32B 2266/025; B32B 2266/0257; B32B 2266/0264; B32B 2266/0271
See application file for complete search history.

(56) References Cited

U.S. PATENT DOCUMENTS

| | | | |
|---|---|---|---|
| 4,759,994 | A | 7/1988 | Lesourd |
| 5,039,571 | A | 8/1991 | Vogelesang et al. |
| 5,547,735 | A | 8/1996 | Roebroeks et al. |
| 5,814,395 | A | 9/1998 | Soellaart-Roelofsen et al. |
| 2003/0031853 | A1 | 2/2003 | Sanadres et al. |
| 2004/0005449 | A1 | 1/2004 | Sugimoto et al. |
| 2004/0242096 | A1* | 12/2004 | Prakash ................. 442/19 |
| 2007/0144111 | A1* | 6/2007 | Kennedy ................. 52/783.17 |
| 2007/0148486 | A1 | 6/2007 | Musaefendic |

FOREIGN PATENT DOCUMENTS

| | | |
|---|---|---|
| EP | 0 312 151 | 4/1989 |
| JP | 51084879 | 7/1976 |
| JP | 51084880 | 7/1976 |
| JP | 52021089 | 2/1977 |
| JP | 54060266 | 5/1979 |
| JP | 60149450 | 8/1985 |
| JP | 60242052 | 12/1985 |
| JP | 61123537 | 6/1986 |
| JP | 62009951 | 1/1987 |
| JP | 62259839 | 11/1987 |
| JP | 62264941 | 11/1987 |
| JP | 64045632 | 2/1989 |
| JP | 1190441 | 7/1989 |
| JP | 4299133 | 10/1992 |
| JP | 5245963 | 9/1993 |
| JP | 6182884 | 7/1994 |
| JP | 6270325 | 9/1994 |
| JP | 7195642 | 8/1995 |
| JP | 8020086 | 1/1996 |
| JP | 8082021 | 3/1996 |
| JP | 8105127 | 4/1996 |
| JP | 8277586 | 10/1996 |
| JP | 9039139 | 2/1997 |
| JP | 10231580 | 9/1998 |
| JP | 10305545 | 11/1998 |
| JP | 2838982 | 12/1998 |
| JP | 2983133 | 11/1999 |
| JP | 2000225664 | 8/2000 |
| JP | 3118066 | 12/2000 |
| JP | 2001150616 | 6/2001 |
| JP | 2001334605 | 12/2001 |
| JP | 2003508270 | 3/2003 |
| JP | 2003096969 | 4/2003 |
| JP | 2003523853 | 8/2003 |
| JP | 2004042649 | 2/2004 |
| JP | 3594877 | 12/2004 |
| JP | 2007512977 | 5/2007 |
| JP | 2007517687 | 7/2007 |
| WO | 2006050610 | 5/2006 |
| WO | 2007062061 | 5/2007 |
| WO | 2008097984 | 8/2008 |

OTHER PUBLICATIONS

D. Mohr et al., "Crushing of soft-core sandwich profiles: experiments and analysis," Int. J. Mech. Sci., vol. 45., p. 253 (2003).
Form PCT/IB/338, dated Feb. 16, 2012, in connection with corresponding international application No. PCT/JP2010/062666, and which includes the English translation of the International Preliminary Report on Patentability (Form PCT/ISA/373) and the Written Opinion of the International Searching Authority (Form PCT/ISA/237).
Extended European Search Report dated Oct. 17, 2013 issued in corresponding EP Application No. 10 80 4437.

* cited by examiner

LAMINATED STEEL PLATE

TECHNICAL FIELD

The present invention relates to a laminated steel plate in which a steel plate is laminated on both faces of a core layer for weight reduction. This application is a national stage application of International Application No. PCT/JP2010/062666, filed Jul. 28, 2010, which claims priority to Japanese Patent Application No. 2009-179851, filed on Jul. 31, 2009 in Japan, the entire contents of which are incorporated herein by reference.

BACKGROUND ART

In various applications such as automobile parts, cases of home electric appliances, furniture, office automation apparatus parts, and the like, there are wide demands for steel plates which are lightweight, highly rigid and shock resistant, and excel in workability for shearing, bending, deep-drawing, extending, and the like, as well as shape stability after being processed. In recent years, as measures for global warming, emissions of $CO_2$ are strictly regulated. In the application of automobile parts in particular, to reduce the emission of $CO_2$, high-level performance is particularly demanded not only for weight reduction but for rigidity and shock resistance, workability and shape stability after being processed. As solutions for such demands, various laminated steel plates are proposed in which a core layer formed of a resin sheet, a resin sheet with inorganic filler, a processed metal plate, a honeycomb, a fiber, and/or the like is laminated between steel plates.

However, laminated steel plates which have been proposed so far have not combined light-weightness, high rigidity, high shock resistance, excellent workability (shearing workability, bending workability, deep-drawing workability, extending workability, and the like), and excellent shape stability after being processed, and the like.

CITATION LIST

Patent Literature

Patent Literature 1: Japanese Laid-open Patent Publication No. 51-84880
Patent Literature 2: Japanese Laid-open Patent Publication No. 51-84879
Patent Literature 3: Japanese Laid-open Patent Publication No. 64-45632
Patent Literature 4: Japanese Laid-open Patent Publication No. 6-270325
Patent Literature 5: Japanese Laid-open Patent Publication No. 61-123537
Patent Literature 6: Japanese Laid-open Patent Publication No. 52-21089
Patent Literature 7: Japanese Laid-open Patent Publication No. 4-299133
Patent Literature 8: Translated National Publication of Patent Application No. 2003-523853
Patent Literature 9: Japanese Laid-open Patent Publication No. 62-259839
Patent Literature 10: Japanese Laid-open Patent Publication No. 62-9951
Patent Literature 11: Japanese Laid-open Patent Publication No. 2000-225664
Patent Literature 12: Japanese Laid-open Patent Publication No. 2001-150616
Patent Literature 13: Japanese Patent No. 2983133
Patent Literature 14: Japanese Laid-open Patent Publication No. 9-39139
Patent Literature 15: Japanese Laid-open Patent Publication No. 2003-96969
Patent Literature 16: Japanese Laid-open Patent Publication No. 10-305545
Patent Literature 17: Japanese Laid-open Patent Publication No. 10-231580
Patent Literature 18: Japanese Laid-open Patent Publication No. 6-182884
Patent Literature 19: Japanese Laid-open Patent Publication No. 2004-42649
Patent Literature 20: Japanese Patent No. 3594877
Patent Literature 21: Japanese Laid-open Patent Publication No. 62-264941
Patent Literature 22: Japanese Patent No. 3118066
Patent Literature 23: Translated National Publication of Patent Application No. 2003-508270
Patent Literature 24: International Publication Pamphlet No. WO2008/097984
Patent Literature 25: International Publication Pamphlet No. WO2007/062061
Patent Literature 26: Japanese Patent No. 2838982
Patent Literature 27: Japanese Laid-open Patent Publication No. 8-82021
Patent Literature 28: Japanese Laid-open Patent Publication No. 8-105127
Patent Literature 29: Japanese Laid-open Patent Publication No. 8-20086
Patent Literature 30: International Publication Pamphlet No. WO2006/050610
Patent Literature 31: Japanese Laid-open Patent Publication No. 54-60266
Patent Literature 32: Japanese Laid-open Patent Publication No. 60-149450
Patent Literature 33: Japanese Laid-open Patent Publication No. 60-242052

Non Patent Literature

Non Patent Literature 1: D. Mohr, Int. J. Mech. Sci., Vol. 45., P.253 (2003)

SUMMARY OF INVENTION

Technical Problem

The present invention is made in view of such problems, and an object thereof is to provide a laminated steel plate which is lightweight, highly rigid and shock resistant, and combines workability for shearing, bending, deep-drawing, extending, and the like, as well as shape stability after being processed.

Solution to Problem

The present inventors have conducted dedicated studies repeatedly for solving the above-described problems, and have found as a result that forming a core layer with a wire group formed in a mesh form and a resin sheet and further controlling a tensile strength of wires and an opening of the meshed wire group allow to combine light-weightness, high rigidity, high shock resistance, excellent damping performance, workability, and excellent shape stability after being processed, and have completed the present invention based on this knowledge.

Specifically, according to the present invention, there is provided a laminated steel plate having a core layer including a wire group formed in a mesh form using wires and a resin sheet, and steel plates joined respectively to both faces of the core layer, in which the wires have a tensile strength of 601 MPa or higher, and an opening of the wire group is equal to or less than ten times the thickness of the steel plates.

Here, in the laminated steep plate, preferably, the tensile strength of the wires is 1000 MPa or higher, more preferably 2000 MPa or higher. A still more preferable range of the tensile strength is 2000 MPa or higher and 6000 MPa or lower.

Further, in the laminated steel plate, preferably, the opening of the wire group is equal to or less than 3.5 times the thickness of the steel plates. In the laminated steel plate, preferably, the opening of the wire group is equal to or more than 0.1 times the thickness of the steel plates, more preferably equal to or more than 0.5 times and equal to or less than 1 times the thickness of the steel plates.

Further, in the laminated steel plate, preferably, a base material of the resin sheet is a foam.

Further, in the laminated steel plate, preferably, the core layer and the steel plates are joined with an adhesive, a shearing adhesion strength of the adhesive and the steel plates is 30 N/cm$^2$ or higher, and a storage modulus G' of the adhesive at 100° C. to 160° C. is 0.05 MPa or higher and 100 MPa or lower.

Further, in the laminated steel plate, weaves may be added to the wire group in an oblique direction with respect to vertical wires and horizontal wires, and furthermore, preferably, the wire group is a square mesh, and the oblique direction is a direction of 45° with respect to directions of the vertical wires and the horizontal wires.

Further, in the laminated steel plate, preferably, the core layer is formed of the wire groups laminated in n (n is integer of 2 or larger) layers, and the direction of the wires forming the wire groups of every layer is shifted in a certain direction by an angle of 360/3n° or more and 360/n° or less between the meshes of adjacent layers, so as to laminate the wire groups of respective layers. In this case, more preferably, the core layer is formed of the wire groups laminated in 2 layers to 20 layers.

Further, in the laminated steel plate, preferably, the core layer has three or more of the wire groups, and among adjacent two of the wire groups selected arbitrarily from three or more of the wire groups, the opening of the wire group disposed on a farther side with respect to a center position in a thickness direction of the core layer is smaller than the opening of the wire group disposed on a nearer side. Furthermore, in the laminated steel plate, preferably, the core layer has a plurality of the wire groups, and the plurality of the wire groups are joined with each other by solid phase joining such as welding or weaving.

Advantageous Effects of Invention

According to the present invention, it is possible to provide a laminated steel plate which is lightweight, highly rigid and shock resistant, and also combines damping performance and workability for shearing, bending, deep-drawing, extending, and the like, as well as shape stability after being processed.

DESCRIPTION OF EMBODIMENTS

Figure 1:
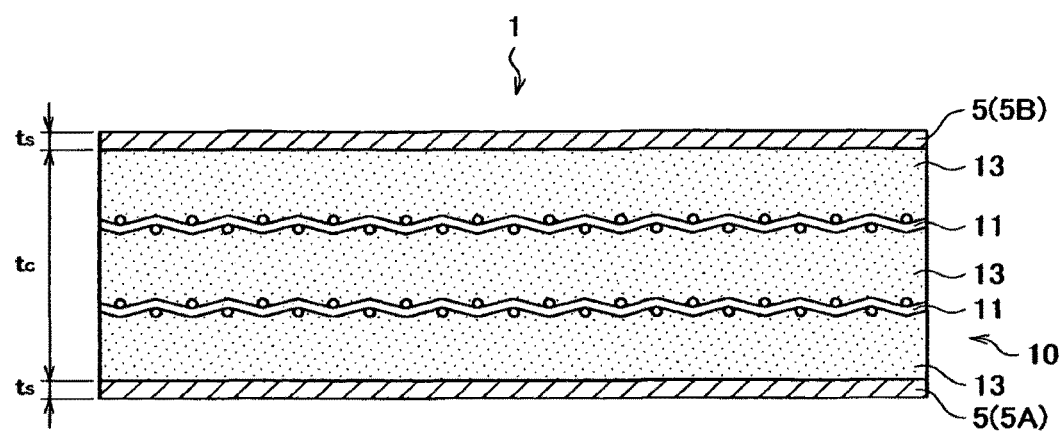
FIG. 1 is a cross-sectional view illustrating an example of the overall structure of a laminated steel plate according to a first embodiment of the present invention.

Hereinafter, preferred embodiments of the present invention will be described in detail with reference to the attached drawings. Note that in this specification and the drawings, components having substantially the same functional structures are given the same reference numerals, and duplicating descriptions are omitted.

[First Embodiment]
[Structure of a Laminated Steel Plate]

First, the overall structure of a laminated steel plate according to a first embodiment of the present invention will be described with reference to FIG. 1.

FIG. 1 is a cross-sectional view illustrating an example of the overall structure of the laminated steel plate 1 according to this embodiment.

As illustrated in FIG. 1, the laminated steel plate 1 according to this embodiment has a structure in which steel plates (hereinafter referred to as "surface layer steel plates") 5 (5A, 5B) are laminated respectively to both faces of a core layer 10. That is, the laminated steel plate 1 has a structure in which the core layer 10 is laminated on the surface layer steel plate 5A, and the surface layer steel plate 5B is further laminated thereon.

The core layer 10 is formed of one or more meshed wire groups 11, and one or more resin sheets 13 of a resin base material formed in a sheet form. When the core layer 10 is formed of two or more meshed wire groups 11 and two or more resin sheets, these meshed wire groups 11 and resin sheets 13 are structured to be laminated on one another. Here, FIG. 1 illustrates an example in which the core layer 10 has a structure such that a resin sheet 13, a meshed wire group 11, a resin sheet 13, a meshed wire group 11, and a resin sheet 13 are laminated in this order from the side of the surface layer steel plate 5. Further, the meshed wire groups 11 and the resin sheets 13 need not be laminated one each in order, and the core layer 10 may have a structure such that at least either the meshed wire groups 11 or the resin sheets 13 are laminated sequentially.

Further, as will be described in detail later, in the laminated steel plate 1 according to this embodiment, preferably, the wire forming the meshed wire groups 11 is a steel wire having a carbon content of 0.24% by mass or more. Moreover, the opening of the meshed wire groups 11 needs to be equal to or smaller than ten times the thickness $t_s$ of a surface layer steel plate 5. Hereinafter, respective members forming the laminated steel plate 1 will be described in detail.

(Structure of the Meshed Wire Group)

Figure 2A:
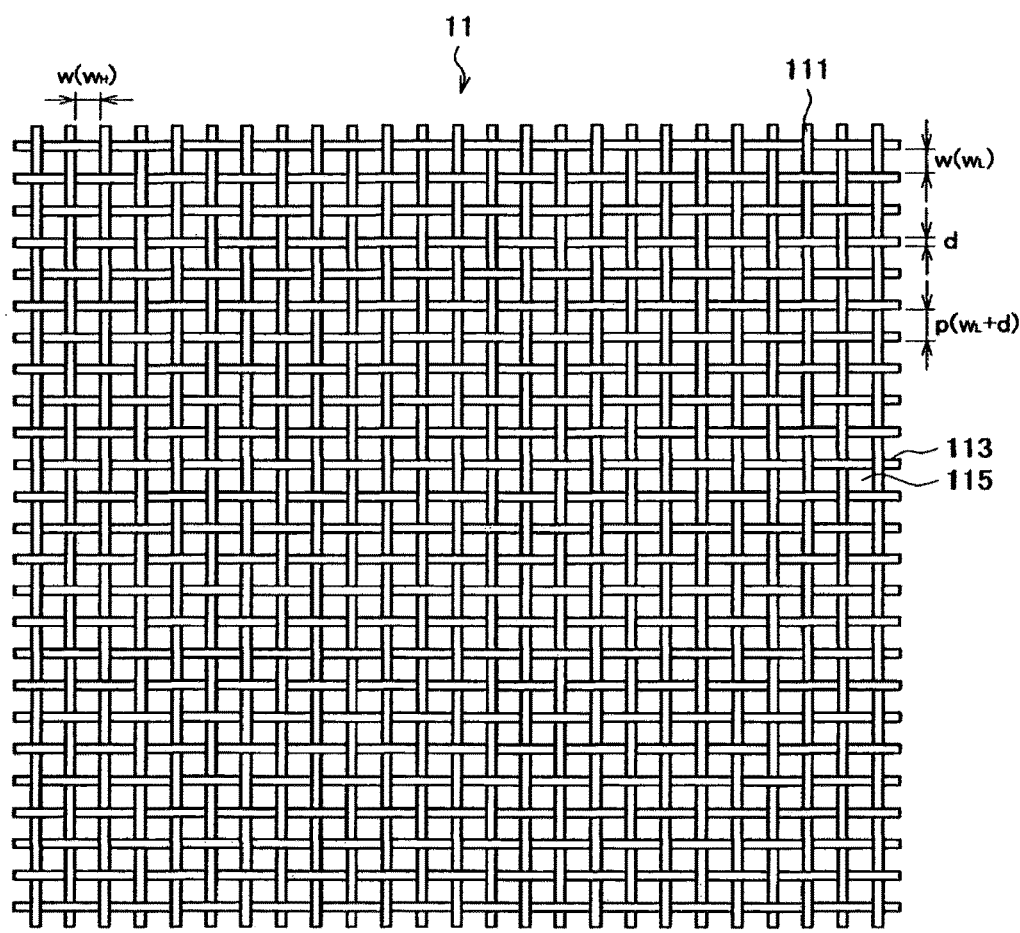
FIG. 2A is a plan view illustrating an example of the structure of a meshed wire group according to the embodiment.
Figure 2B:
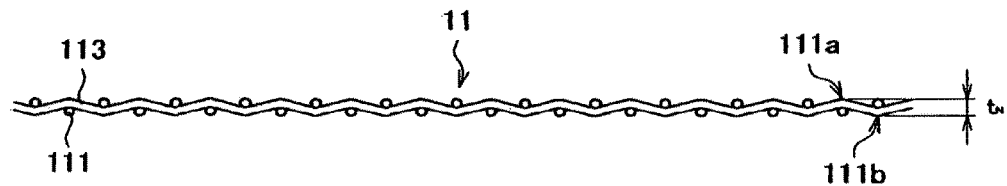
FIG. 2B is a cross-sectional view illustrating an example of the structure of the meshed wire group according to the embodiment.

First, the structure of a meshed wire group 11 according to this embodiment will be described in detail with reference to FIG. 1, FIG. 2A and FIG. 2B. FIG. 2A and FIG. 2B are views illustrating an example of the structure of the meshed wire group 11 according to this embodiment. FIG. 2A illustrates a plan view and FIG. 2B illustrates a cross-sectional view.

As illustrated in FIG. 2A, the meshed wire group 11 is formed in a meshed form by using wires for vertical wires 111 and horizontal wires 113. Here, the vertical wires 111 mean wires running in a longitudinal direction (vertical direction in the example illustrated in FIG. 2A) among all the wires forming the meshed wire group 11. Further, the horizontal wires 113 mean wires running in a width direction (horizontal direction in the example illustrated in FIG. 2A) orthogonal to the longitudinal direction among all the wires forming the meshed wire group 11. Further, in the example illustrated in FIG. 2A, an opening w ($w_L$, $w_H$) of the meshed wire group 11 means a distance between two adjacent vertical wires 111 or horizontal wires 113. In some cases, a distance between two adjacent vertical wires 111 is referred to as opening $w_L$, and a distance between two adjacent horizontal wires 113 is referred to as opening $w_H$, so as to distinguish them.

When the meshed wire group 11 has square openings, $w_L = w_H$ holds true. Further, in the meshed wire group 11, holes (meshes) 115 exist respectively at portions surrounded by the vertical wires 111 and the horizontal wires 113, and by the existence of these holes 115, the core layer 10 can be reduced in weight as compared to a steel plate, an Al plate, or the like. In addition, the sum of the diameter (wire diameter) d of the wires forming the meshed wire group 11 and the opening w is referred to as a pitch (mesh pitch) p. Note that the opening w described below is defined by a long side of a rectangular having a maximum area internally touching a hole and indicates an average of long sides in ten arbitrarily chosen holes, and indicates, when the wires are arranged in parallel, a mean interval of wires arranged in parallel.

Further, the thickness $t_N$ of the meshed wire group 11 is represented by a distance between one bending portion 111a and another bending portion 111b of the vertical wires 111 or horizontal wires 113. In the example illustrated in FIG. 2B, the thickness $t_N$ of the meshed wire group 11 is represented by a distance between an upper bending portion 111a and a lower bending portion 111b of the horizontal wire 113. As described above, in the laminated steel plate 1 according to this embodiment, the core layer 10 is formed of one or more meshed wire groups 11 and one or more resin sheets 13. The thickness of the core layer 10 differs depending on how the meshed wire group 11 and the resin sheet 13 are laminated. When the meshed wire group 11 is not embedded in the resin sheet 13, the thickness $t_c$ of the core layer 10 is $t_c = n_1 \times t_N + n_2 \times t_R$, where the number of meshed wire groups 11 is $n_1$, the thickness of the resin sheet 13 is $t_R$, and the number of resin sheets 13 is $n_2$. On the other hand, when it is embedded, the thickness is $t_c = n_2 \times t_R$. Further, when it is partially embedded, $t_c$ is between them.

<Tensile Strength of the Wires>

Even when an opening which allows weight reduction is secured, the strength of the core layer is secured if the tensile strength of the wires forming the meshed wire group is 601 MPa or higher. As a result, after the laminated steel plate is subjected to intense processing such as bending or deep drawing, the core layer would not be destroyed and would be kept sound. Preferably, the tensile strength of the wires is 1000 MPa or higher, more preferably 2000 MPa or higher, and in this range the above-described effects are secured and shock absorbing performance can also be obtained. On the other hand, in terms of shearing and bending workability, preferably, the tensile strength of the wires is 6000 MPa or lower. When the tensile strength of the wires is higher than 6000 MPa, shearing resistance of the core layer becomes large, and bending force and shearing force applied to each of a surface layer and a joining layer between a surface layer and an adhesive layer increase when the laminated steel plate is bent, where surface layer destruction or delamination and destruction in the adhesive layer occurs easily.

<Diameter of the Wires>

The diameter d of the wires (wire diameter d) is not particularly limited, may be equal to or less than a necessary thickness of the core layer 10 from a viewpoint of rigidity and shock resistance which are needed depending on an application of the laminated steel plate 1, and can be determined appropriately depending on characteristics (plate density, rigidity, shock resistance, and so on) of the laminated steel plate 1 which should be given priority for each application. For example, when the plate density of the laminated steel plate 1 is particularly important, the wire diameter d can be determined from following expression (1) and expression (2) according to the opening of the meshed wire group 11 and the plate density $\rho_{target}$ as the target of the core layer 10. Further, when shock resistance of the laminated steel plate 1 is particularly important, the wire diameter d can be determined from following expression (3) and expression (2) according to a bending moment $Mp_{target}$ in a plastic deformation range as a dominant factor of the shock resistance.

$$\rho_{target} > 7.8 \times (1 - V_{air}) \times n \quad (1)$$

$$V_{air} = w^2 / (w+d)^2 \quad (2)$$

$$Mp_{target} < \tfrac{1}{4}\sigma_{Ys}[(t_s+t_c)^2 - t_c^2] + \tfrac{1}{8}(1 - V_{air})\sigma_{Yc} \quad (3)$$

(In above expressions (1) to (3), $\rho_{target}$ denotes target plate density of the core layer 10, $V_{air}$ denotes volume of the hole 115 portion in the core layer 10, n denotes the number of laminations in the meshed wire group 11, w denotes opening of the meshed wire group 11, $Mp_{target}$ denotes target bending moment, $\sigma_{Ys}$ denotes yield strength of the surface layer steel plate 5, $\sigma_{Ys}$ denotes yield strength of the core layer 10, $t_s$ denotes thickness of the surface layer steel plate 5, $t_c$ denotes thickness of the core layer 10, and d denotes wire diameter of the meshed wire group 11.)

<Opening of the Meshed Wire Group>

In the laminated steel plate 1 according to this embodiment, it is necessary that the opening w of the meshed wire group 11 is equal to or less than ten times the thickness $t_s$ of the surface layer steel plate 5. The opening w of the meshed wire group 11 thus being equal to or less than ten times the thickness $t_s$ of the surface layer steel plate 5 is decided from consideration by the present inventors. It is assumed the case of a tensile deformation of the laminated steel plate 1 having the core layer 10 in which a tensile strength ratio between the wires as the base material of the core layer 10 and the surface layer steel plate 5 is equal to or smaller than 1/50 (which is a value with a larger tensile strength being the denominator). In this case, by FEM (finite element method) analysis, it was found that when the length of one side of the hole 115 (the opening w) existing in the core layer 10 is more than ten times the thickness of the surface layer steel plate 5, stress concentrates in a portion located above the hole 115 in the surface layer steel plate 1, and the surface layer steel plate 5 fractures early. In the surface layer steel plate 5, the substantial steel plate thickness differs between the portion located above the holes 115 of the core layer 10 and a portion located above the wires (vertical wires 111 and horizontal wires 113). Accordingly, the strength (tensile strength and yield strength) in the portion located above the holes 115 becomes smaller than the strength of the portion located above the wires. As a result, when a tensile deformation or compressive deformation is applied to the laminated steel plate 1, stress concentrates in the portion located above the holes 115 having a low strength in the surface layer steel plate 5, fracture elongation decreases, and thus workability decreases.

By miniaturizing the opening w of the meshed wire group 11 to be equal to or smaller than ten times the thickness $t_s$ of the surface layer steel plate 5, stress concentrating in the portion located above the hole 115 of the surface layer steel plate 5 during tensile or compressive deformation of the laminated steel plate 1 can be dispersed, and the fracture elongation of the surface layer steel plate 5 can be increased. As a result, workability of the laminated steel plate 1 can be improved, and processing stability of the laminated steel plate 1 can be secured even when the intense processing such as bending and deep-drawing is applied. In addition, to disperse the stress sufficiently, preferably, the opening w of the meshed wire group 11 is equal to or smaller than 3.5 times the thickness $t_s$ of the surface layer steel plate 5.

Further, the smaller the opening w of the meshed wire group 11, the more the stress concentrating in the portion located above the holes 115 of the surface layer steel plate 5 can be dispersed. Moreover, even if a crack occurs in the surface layer steel plate 5, this crack is confined in the hole 115 having the small opening w and is difficult to be transmitted to other portions. Therefore, the smaller the opening w of the meshed wire group 11, the more it is preferred in the aspect of workability. On the other hand, when the opening w of the meshed wire group 11 is small, the plate density of the core layer 10 increases due to the above-described expressions (1) and (2). Accordingly, considering a viewpoint of securing light-weightness, preferably, the opening w of the meshed wire group 11 is equal to or larger than 0.1 times the thickness $t_s$ of the surface layer steel plate 5.

From a viewpoint of achieving excellent workability and processing stability compatibly with light-weightness in a higher degree as described above, preferably, the opening w of the meshed wire group 11 is equal to or more than 0.5 times and equal to or less than one times the thickness $t_s$ of the surface layer steel plate 5.

Further, in this embodiment, since the meshed wire group 11 forming a mesh is contained in the core layer 10, it is easier to control the size of the holes than when performing punching, dimpling, or the like on a plate material of metal or the like to form the holes. That is, it is easy to control the length of one side of the hole 115 (opening w) to the minute size equal to or smaller than ten times the thickness $t_s$ of the surface layer steel plate 5. Accordingly, with the laminated steel plate according to this embodiment, cost reduction, improvement in productivity, and the like are also possible.

<Method of Forming the Meshed Wire Group>

In a formation method of the meshed wire group 11, as long as the above-described conditions of tensile strength and opening of the wires are satisfied, a manner of weaving, a manner of knitting, or the like is not particularly limited, and any of square, diamond, hexagonal, rectangular, and the like for example, may be employed. As square meshed wire groups 11, there are weave meshed wire group, crimp meshed wire group, and so on. Specific examples of the weave meshed wire group include plain weave, twill weave, basket weave, basket twill weave, and the like. Further, specific examples of the crimp meshed wire group include crimp weave, lock crimp weave, double crimp weave, flat crimp weave, ton-cap screen weave, slot screen weave, and the like. Further, the formation method of the meshed wire group 11 may be solid-state joining such as welding rather than the weaving or knitting. That is, the vertical wires 111 and the horizontal wires 113 may be joined by solid-state joining such as welding to form a mesh. Moreover, as a method of weaving the meshed wire group 11, three-dimensional weaving may be employed rather than two-dimensional weaving.

Among the above-described forming methods of the meshed wire group 11, the plain-woven meshed wire group is preferred from a viewpoint of easiness in production and economic efficiency, and a flat-top woven meshed wire group is preferred from a viewpoint of joining property of the surface layer steel plate 5 and the core layer 10.

Further, in the meshed wire group 11 according to this embodiment, weaves (wires) in an oblique direction may be added to the square openings using the above-described wires. This oblique direction means a direction to cross both the vertical wires 111 and the horizontal wires 113. Specifically, for example, weaves (wires) in a direction at 15°, 30°, 45°, or the like with respect to the direction of the vertical wires 111 or horizontal wires 113 may be added to the square meshed wire group 11.

<Regarding the Binding Effect for the Surface Layer Steel Plate by the Meshed Wire Group>

Figure 3:
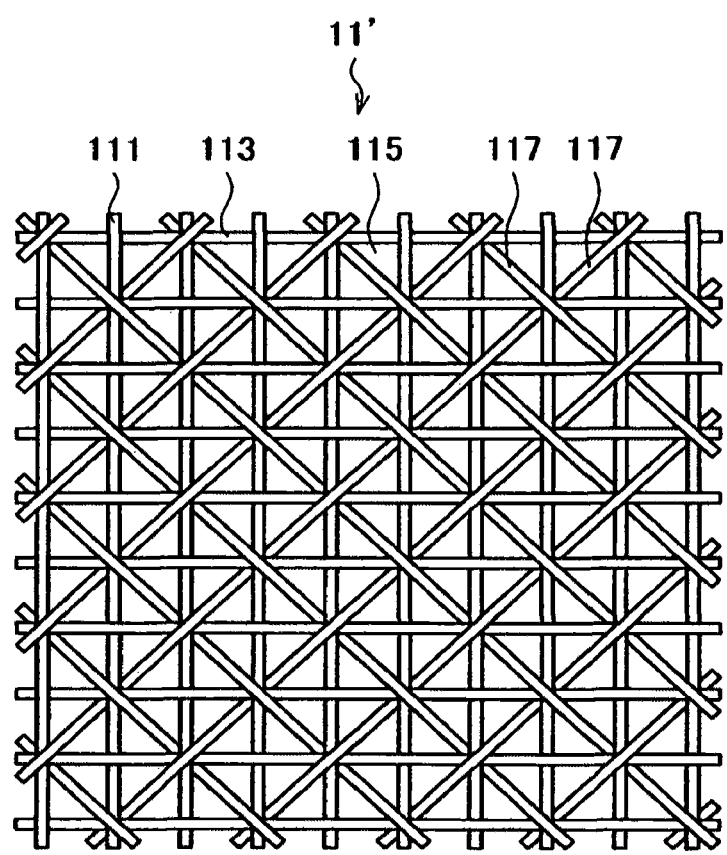
FIG. 3 is a plan view illustrating the structure of a modification example of the meshed wire group according to the embodiment.

FIG. 3 is a plan view illustrating the structure of a modification example of the meshed wire group according to this embodiment. In this embodiment, in order for a binding effect, which will be described below, for the surface layer steel plate 5 by the meshed wire group 11 to be exhibited efficiently, as a meshed wire group 11' illustrated in FIG. 3, preferably, in particular, weaves (wires) 117 in an orthogonal direction at 45° with respect to the directions of the vertical wires 111 and the horizontal wires 113 are added to the square meshed wire group formed of the vertical wires 111 and the horizontal wires 113.

Figure 4:
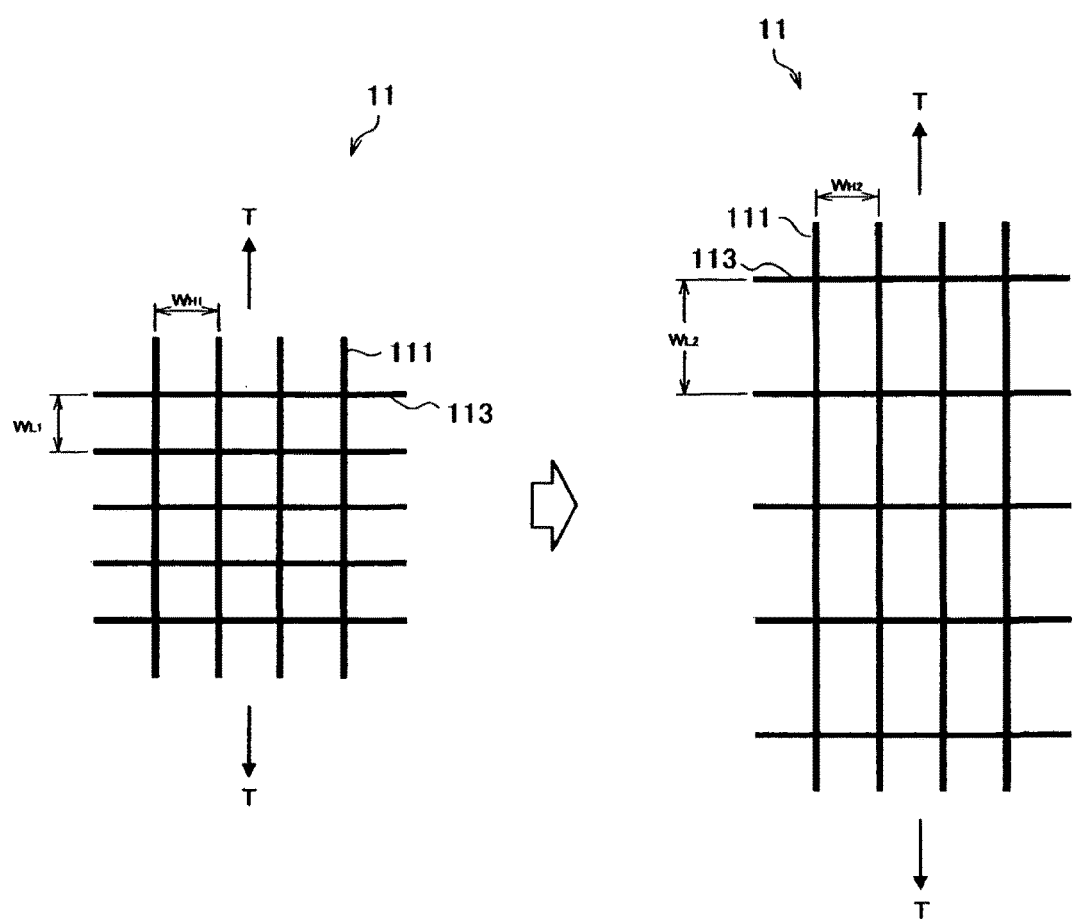
FIG. 4 is an explanatory view illustrating an example of a binding effect for a surface layer steel plate by the meshed wire group according to the embodiment.

Here, the binding effect for the surface layer steel plate 5 by the meshed wire group 11 will be described with reference to FIG. 4. FIG. 4 is an explanatory view illustrating an example of the binding effect for the surface layer steel plate by the meshed wire group according to this embodiment. Note that in FIG. 4, the vertical wires 111 and the horizontal wires 113 are depicted with solid lines for the convenience of explanation.

In this embodiment, the meshed wire group 11 is contained in the core layer 10. It is assumed that, as illustrated in the left view in FIG. 4, the meshed wire group 11 is, for example, tensile processed by force T along the direction of the vertical wires 111. Then, as illustrated in the right view of FIG. 4, a tensile deformation occurs in the direction of the vertical wires 111, while the tensile deformation does not occur in the direction of the horizontal wires 113. That is, the vertical opening $w_{L2}$ after the tensile processing is larger than the vertical opening $w_{L1}$ before the tensile processing, but the horizontal opening $w_{H2}$ after the tensile processing is substantially the same as the horizontal opening $w_{H1}$ before the tensile processing, and the horizontal opening barely changes before and after the tensile processing.

Thus, when the core layer 10 has the meshed wire group 11, if the wires (vertical wires 111 and horizontal wires 113) forming the meshed wire group 11 are partially arranged perpendicular to the direction of compressive deformation or tensile deformation during bending, the wires forming the meshed wire group 11 do not deform, and an effect of binding Poisson deformation of the surface layer steel plate 5 is obtained. By this binding effect, the Young's modulus Es of the surface layer steel plate 5 can be increased, and it is possible to efficiently increase the rigidity EI of the laminated steel plate 1 represented by following expression (4). In addition, such a binding effect is exhibited by using the meshed wire group 11, and cannot be obtained by, for example, one formed by punching a plate material of metal or the like.

$$EI=(1/12)E_s[(t_s+t_c)^3-t_c^3]+1/12E_ct_c^3 \quad (4)$$

(In above expression (4), EI is rigidity of the laminated steel plate 1, $E_s$ is Young's modulus of the surface layer steel plate 5, $E_c$ is Young's modulus of the core layer 10, $t_s$ is thickness of the surface layer steel plate 5, and $t_c$ is thickness of the core layer 10.)

In this embodiment, by arranging the wires (vertical wires 111 and horizontal wires 113) perpendicular to the deformation direction as described above while securing isotropy, the binding effect of the surface layer steel plate 5 is exhibited in a wide deformation direction. Accordingly, as the meshed wire group contained in the core layer 10, preferably, the meshed wire group 11' is used in which weaves (wires) 117 in an oblique direction at 45° with respect to the direction of the vertical wires 111 and the horizontal wires 113 are added to the square meshed wire group formed of the vertical wires 111 and the horizontal wires 113.

<Lamination of the Meshed Wire Groups>

As described above, there may be one meshed wire group 11 contained in the core layer 10 according to this embodiment, or two or more meshed wire groups may be laminated. Further, one or more meshed wire groups 11 may be randomly arranged two-dimensionally. In addition, when two or more groups are laminated, the case where the resin sheet 13 is laminated between two meshed wire groups 11 is included. In particular, in this embodiment, when n layers (n is two or more) of meshed wire groups 11 are laminated in the core layer 10 to increase the isotropy of the core layer 10, it is possible to shift the direction of wires forming the meshed wire group 11 of each layer in a certain direction by angles of 360/3n° or more and 360/n° or less between the adjacent layers of meshed wire groups 11, so as to laminate the meshed wire groups 11 of respective layers. To illustrate such a method of laminating, there is a method to laminate four layers such that on the lowest meshed wire group 11, the meshed wire groups 11 as upper layers thereof are laminated with each of them being rotated by 45°. From a viewpoint of increasing isotropy, preferably, the number n of layers of meshed wire groups 11 is increased and the meshed wire groups 11 are laminated with each of them being rotated by minute angles (360/3n° to 360/n° each). On the other hand, from a viewpoint of economic rationality, an upper limit is preferably set for the number of layers. Therefore, preferably, the number of meshed wire groups 11 to be laminated is two or more and 20 or less. In addition, when two or more meshed wire groups 11 are laminated, respective meshed wire groups may be arranged in parallel without rotating.

Figure 5:
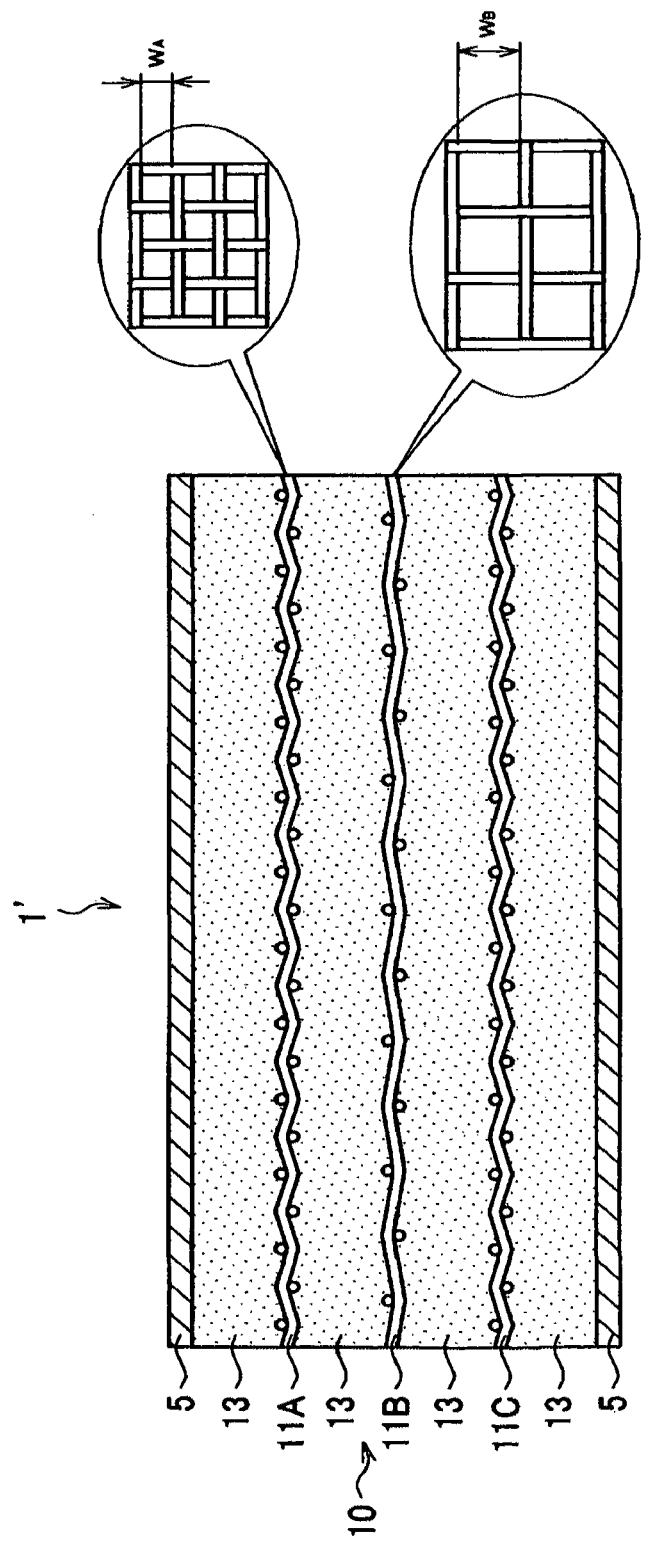
FIG. 5 is a cross-sectional view illustrating the structure of a modification example of the laminated steel plate according to the embodiment.

Here, with reference to FIG. 5, a preferred example of the case where the core layer 10 has a structure in which three or more meshed wire groups 11 are laminated will be described. FIG. 5 is a cross-sectional view illustrating the structure of a modification example of a laminated steel plate 1' according to this embodiment.

As illustrated in FIG. 5, the core layer 10 in the laminated steel plate 1' has a structure in which a resin sheet 13, a meshed wire group 11A, a resin sheet 13, a meshed wire group 11B, a resin sheet 13, a meshed wire group 11C, and a resin sheet 13 are laminated in this order from the side of the surface layer steel plate 5. Then, the opening $w_A$ of the two meshed wire groups 11A, 11C disposed on a side close to the surface layer steel plate 5 is smaller than the opening $w_B$ of the meshed wire group 11B disposed on a side far from the surface layer steel plate 5. Thus, it is preferred that the opening of the meshed wire group disposed on a far side with respect to a center position in the thickness direction of the core layer be smaller than the opening of the meshed wire group disposed on a near side with respect to the center position in the thickness direction of the core layer. This is due to the following reason.

Generally, a center portion in a thickness direction of a steel plate has a relatively small contribution to rigidity or shock resistance. Accordingly, the meshed wire group 11B with a large opening and low strength is disposed in the center portion in the thickness direction of the core layer 10 of the laminated steel plate 1 having a relatively small contribution to rigidity and shock resistance, so as to further reduce the weight. On the other hand, on the side of the surface layer steel plate 5 having a relatively large contribution to rigidity and shock resistance, the meshed wire groups 11A, 11C having a small opening and high strength are disposed, so as to secure rigidity and shock resistance. Thus, in the laminated steel plate 1' according to the modification example of this embodiment, the opening $w_A$ of the meshed wire groups 11A, 11C on the side of the surface layer steel plate 5 is made relatively smaller, and the opening $w_B$ of the meshed wire group 11B disposed on the center side of the core layer 10 is made relatively larger.

In addition, when plural meshed wire groups 11 and resin sheets 13 are laminated, an adhesive or the like, which will be described later, can be used to join the respective meshed wire groups 11 and the resin sheets 13. Further, when two meshed wire groups 11 are joined directly, a binding force with respect to a shearing deformation may be added by welding or weaving a joining point to increase a friction force at the joining point.

<Material for the Wires>

In this embodiment, for the wires forming the mesh, ones having a tensile strength of 601 MPa or higher will suffice, and the following metallic, inorganic, organic wires are conceivable. Among others, metallic wires are more preferred because, when deformation behaviors are made similar between the core layer and the surface layers, and a large deformation such as bending is applied, core layer and surface layers deform integrally in them. The most preferred one from this viewpoint is a steel wire. As metallic wires, there are steel wires of carbon steel whose carbon content is 0.24% or more, austenite, ferrite-based stainless steel, and the like, copper-based wires of copper, brass, bronze, phosphor bronze, and the like, nickel wires of nickel, nickel/copper, nickel/chrome, nickel/chrome/molybdenum alloy, and the like, titanium wires, aluminum wires, and the like. In addition, in the case of iron-based wires, publicly known plating such as zinc plating, Ni plating, brass plating, copper plating, or the like may be performed. Further, as the inorganic wires, there are inorganic fibers such as PAN-based, pitch based carbon fibers, glass fibers, alumina fibers, and silicon carbide fibers. Furthermore, as the organic wires, there are high-strength high-modulus organic fibers such as aramid fibers, polyarylate fibers, high-strength polyolefin fibers (for example, high-strength fiber called high-polymer polyethylene fibers, or the like).

<Composition of Steel Wires>

When steel wires are used for the meshed wire group 11 in this embodiment, it is preferred that the carbon content thereof be 0.24% by mass or more. By having the carbon content of steel wires of 0.24% by mass or more, the tensile strength of the steel wires can be secured. For example, when the steel wire density in the core layer 10 is lowered to a required plate density (mass ratio of the steel plates in the core layer 10), it is possible to secure the tensile strength and the yield strength of the meshed wire group 11 of the core layer 10 needed when the laminated steel plate 1 is processed or needed in a product after being processed. Accordingly, it is possible to reduce the weight of the laminated steel plate 1 sufficiently while keeping high rigidity and shock resistance of the laminated steel plate 1.

On the other hand, when the carbon content of the steel wires is less than 0.24% by mass, the tensile strength and the yield strength of the steel wires decrease. Therefore, unless the steel wire strength in the core layer 10 is increased and reinforced, the necessary tensile strength and yield strength of the core layer 10 cannot be secured, and the weight of the laminated steel plate 1 cannot be reduced sufficiently. Further, as the steel wires, specifically, JIS G 3506-2004, JIS G 3502-2004, or the like can be used preferably, but the steel wires are not limited to these, and any steel wires satisfying the above-described composition can be used as the steel wires forming the meshed wire group 11 of this embodiment.

Moreover, from a viewpoint of further improving the tensile strength and the yield strength of the core layer 10, it is preferred that the carbon content of the steel wires be 0.60% by mass or more. Accordingly, even when the plate density of the core layer 10 is decreased lower than conventional ones, the tensile strength and the yield strength of the core layer 10 can be secured sufficiently, and thus it is possible to achieve a higher level of light-weightness compatibly with rigidity and shock resistance. On the other hand, when the carbon content of the steel wires is too high, the meshed wire group 11 of the core layer 10 becomes too hard. Thus, there is a concern that control of the opening of the meshed wire group 11 to intervals as minute as ten times the thickness of the surface layer steel plate 5 becomes difficult. From such a viewpoint, it is preferred that the carbon content of the steel wires be 0.96% or less.

(Structure of the Resin Sheet)

Next, the structure of the resin sheet 13 according to this embodiment will be described. As a base material for the resin sheet 13 according to this embodiment, the type of resin is not particularly limited. A resin sheet formed of a thermoplastic resin, thermosetting resin, elastomeric body, or the like, or a mixture of one or more of these can be used. Specifically, examples of the type of resin for the resin sheet 13 include general-purpose vinyl-based resin sheet of polystyrene, polymethyl methacrylate, hard or soft vinyl chloride, high-density or low-density or linear low-density polyethylene, polypropylene, or the like, elastomer-based resin sheet of ionomer, polyolefin-based elastomer, styrene-based elastomer, or the like, polyester resin sheet of polycarbonate, polyethylene terephthalate, polybutylene terephthalate, polyarylate, or the like, polyamide resin sheet of 6-nylon, 66-nylon, 12-nylon or the like, polyimide resin sheet, polyester carbonate resin sheet, condensation thermoplastic resin sheet of polyphenylene ether, or the like, thermoplastic resin sheet of epoxy resin, phenol resin, urea resin, polyester melamine resin, or the like, and a mixture of them. Further, for the purpose of reforming sheet formability, shock resistance, and the like of the resin sheet 13, it is possible to mix in the above-described resin a condensation polymer of vinyl halide resin of polystyrene, polymethyl methacrylate, hard or soft vinyl chloride, or the like, general-purpose vinyl-based resin of high-density or low-density or linear low-density polyethylene, polypropylene, amorphous polyolefin, or the like, elastomer-based resin of ionomer, polyolefin-based elastomer of ethylene-propylene copolymer, ethylene-butene copolymer, ethylene-vinyl acetate copolymer, or the like, styrene-based elastomer, or the like, polycarbonate, or the like.

Since the resin sheet 13 is reinforced with the meshed wire group 11, it excels in shape stability at high temperatures as compared to resin sheets not including a reinforcing material like the meshed wire group 11. Therefore, although it is not necessary to specify heat resistance of the base material of the resin sheet 13, when it is an amorphous resin sheet 13, it is preferred that its glass transition temperature be at 100° C. or higher. Further, when it is a crystalline resin sheet 13, it is preferred that its melting point be at 120° C. or higher. In the resin sheet 13 using a base material whose glass transition temperature and melting point (crystallization temperature) are out of such temperature ranges, a creep deformation occurs locally during hot painting, and irregularities corresponding to the hole portions 115 of the meshed wire group 11 may occur on the surface of the surface layer steel plate 5.

Moreover, to secure adhesion of the surface layer steel plate 5 and the meshed wire group 11 with the resin sheet 13, it is preferred that the resin sheet 13 contain a resin in which a polar group is introduced, such as a carboxyl group, acid anhydride group, phosphate group, sulfonic group, metallic salt or active group of these, epoxy group, hydroxyl group, amino group, carbonyl group, ester linkage group, carbonate linkage group, amide linkage group, imide linkage group, or the like.

From the above reasons, the most preferred resin base material for the resin sheet 13 is a polyester resin or polyamide resin, and more specifically, polyethylene terephthalate, polybutylene terephthalate, 6-nylon, 66-nylon, 12-nylon, or the like is particularly preferred. The resin sheet 13 using such a resin base material has heat resistance, and favorable adhesion between the surface layer steel plate 5 and the meshed wire group 11 with the resin sheet 13 can be secured due to a polar group such as ester group, amide group, or end carboxyl group, hydroxyl group, amino group, or the like in a molecule chain. Moreover, such a resin sheet 13 excels in balance of mechanical properties such as strength and toughness. More preferably, it is a resin sheet 13 using a polyester resin or polyamide resin using a carboxyl group remains by 70% or more of a molecule chain end as a resin base material. Among various substituents, the carboxyl group has the largest adhesion with the surface layer steel plate 5 and the meshed wire group 11, and thus the more the carboxyl group is contained in the resin base material, the higher the adhesion of the resin sheet 13 with the surface layer steel plate 5 and the meshed wire group 11. In addition, the above-described resins are obtained by polymerization by sealing an end with a chemical compound containing a 2-functional carboxyl group or more, in which a slightly more monomer containing a carboxyl group is blended, or the like. Further, the remaining ratio of the end carboxyl group can be calculated from a ratio between an end radix obtained by neutralization titration of a resin base material, dissolved in a solvent having an affinity, with an alkaline solution, and an end radix calculated from a number average molecular weight obtained by SEC (Size Extrusion Chromatography).

Further, in the resin sheet 13 according to this embodiment, preferably, a foam is used as the resin base material so as to exhibit a weight reduction effect. In this case, the expansion ratio of the foam is preferably two or more, more preferably four or more, further preferably ten or more, so as to exhibit a sufficient weigh reduction effect. On the other hand, the expansion ratio of the foam is preferably 15 or less. This is because, although it is possible to exhibit an improving effect of compressive strength of the core layer 10 by the reinforcement effect of the meshed wire group 11 even when the expansion ratio is more than 15, the elastic modulus and the shearing strength decrease significantly, and a shear failure or buckling easily occurs when the laminated steel plate 1 is processed.

When the foam is used as the resin base material of the resin sheet 13, it is preferred that the bubbles be dispersed so that a distance between adjacent bubbles is 0.1 µm or larger and 5 µm or smaller. By making the distance between adjacent bubbles become 0.1 µm or larger, stress concentrates in the interface between finely dispersed bubbles and a matrix resin, and as a result, the stress can be dispersed in the entire laminated steel plate 1. Further, by controlling the distance between adjacent bubbles to be 5 µm or smaller, a plastic deformation area formed by the stress concentrating in the interface between the bubbles and the matrix resin can be continuous, thereby preventing a crack transmission and improving toughness of the resin sheet 13. As a result, even when the laminated steel plate 1 is subjected to cold intense processing, it is possible to prevent destruction by the resin sheet 13 using the foam. A more preferred range of the distance between adjacent bubbles is 2.0 µm or smaller, more preferably 1.0 µm or smaller. The smaller the distance between adjacent bubbles, the easier the plastic deformation area becomes continuous and easier the improvement in toughness of the resin sheet 13.

Further, preferably, the mean bubble diameter of the foam used as the resin base material of the resin sheet 13 is controlled to be 0.1 µm or larger and 10 µm or smaller. When the mean bubble diameter is less than 0.1 µm, it is difficult to concentrate stress in the interface between the bubbles and the matrix resin. On the other hand, when the mean bubble diameter is larger than 10 µm, it is difficult to control the distance between adjacent bubbles to be in the above-described preferred range. From such a viewpoint, the mean bubble diameter is preferably 5 µm or smaller, more preferably 3 µm or smaller. Here, the distance between adjacent bubbles and the mean bubble diameter can be evaluated by observing a cross-section of the resin sheet 13 with a scanning electron microscope or the like, and performing image processing or the like. Specifically, a microscopic cross-sectional image is digitalized, and the mean bubble diameter can be calculated as a mean value of an equivalent circle diameter as a diameter when it is replaced with the area of a circle. Moreover, the distance between adjacent bubbles can be estimated from a distance between bubble circumferences on a straight line coupling the centers of bubbles.

Further, the resin sheet 13 according to this embodiment may be subjected to a publicly known surface treatment such as corona treatment, plasma treatment, or UV treatment so as to increase a critical surface tension, thereby improving adhesion with the surface layer steel plate 5 and the adhesive. From a viewpoint of securing adhesion with the surface layer steel plate 5, it is preferred that the critical surface tension be controlled to 45 dyn/cm (mN/m) or higher by the surface treatment before the resin sheet 13 is laminated. Further, when the resin sheet 13 is laminated via an adhesive, it is preferred that an adhesive, which will be described later, be used for the adhesion and heat-resistant shape stability.

Here, in this embodiment, preferably, the meshed wire group 11 is embedded in the resin sheet 13. Here, "the meshed wire group 11 is embedded in the resin sheet 13" means a state that a portion corresponding to 90% or more of the volume of the entire meshed wire group 11 is wrapped in the resin sheet 13. By embedding the meshed wire group 11 in the resin sheet 13, the elastic modulus and the tensile strength of the core layer 10 can be increased, and the rigidity and the shock resistance can be increased. Further, by embedding the meshed wire group 11 in the resin sheet 13, a contact between the surface layer steel plate 5 and the meshed wire group 11 or between meshed wire groups 11 is made via the resin sheet 13. Thus, the resin sheet 13 can serve a role like a shock-absorbing member, so as to improve damping performance of the laminated steel plate 1. Further, by embedding the meshed wire group 11 in the resin sheet 13, the weight can be reduced while securing the thickness larger than the case of the single meshed wire group 11. Moreover, even when the meshed wire group 11 having the hole portions 115 is used, the hole portions 115 can be filled with the resin, and thus the contact area between the core layer 10 and the surface layer steel plate 5 can be increased to improve the adhesion between the core layer 10 and the surface layer steel plate 5. Moreover, corrosion can be prevented by suppressing adhesion of water to the inside of the surface layer steel plate 5 due to dew condensation or the like, and thus corrosion resistance of the laminated steel plate 1 can also be improved.

Further, it is preferred that the thickness of the resin sheet 13 be larger than 40% of the thickness of the meshed wire group 11. When the thickness of the resin sheet 13 is equal to or smaller than 40% of the thickness of the meshed wire group 11, there is a concern that the laminated steel plate 1 cannot exhibit sufficient damping performance.

(Structure of the Surface Layer Steel Plate)

The surface layer steel plate 5 according to this embodiment is not particularly limited. Specifically, it is possible to use, for example, steel plate for can such as tin or thin tin plated steel plate, electrolytic chromic acid treated steel plate (tin-free steel), nickel plated steel plate, or the like, hot-dip steel plate such as hot-dip galvanized steel plate, hot-dip galvanized-iron alloy plated steel plate, hot-dip zinced-aluminum-magnesium alloy plated steel plate, hot-dip aluminum-silicon alloy plated steel plate, hot-dip lead-tin alloy plated steel plate, or the like, surface treated steel plate of electroplated steel plate or the like, such as electrogalvanized steel plate, electrogalvanized-nickel plated steel plate, electrogalvanized-iron alloy plated steel plate, electrogalvanized-chrome alloy plated steel plate, or the like, cold-rolled steel plate, hot-rolled steel plate, stainless steel plate, or the like. Further, the surface layer steel plate 5 may be a surface treated steel plate such as a painted steel plate, printed steel plate, film-laminated steel plate, or the like.

Furthermore, it is possible to laminate the core layer 10 between different kinds of steel plates. Specifically, in an application where bending, deep-drawing, or the like is needed, it is possible that the core layer 10 is laminated between steel plates with a different strength, a soft steel is used on a surface which has a small radius of curvature r and is difficult to be processed, and a high-tensile steel is used for the other surface so as to secure the strength.

Further, it is possible to perform a publicly known surface treatment on the surface of the surface layer steel plate 5 according to this embodiment, so as to improve adhesion and corrosion resistance. Examples of such a surface treatment include chromate treatment (reactive type, coating type, electrolytic), phosphate treatment, organic resin treatment, and the like, but are not limited to them.

(Joining of the Resin Sheet and the Surface Layer Steel Plate or the Meshed Wire Group)

Next, joining of the resin sheet 13 and the surface layer steel plate 5 or the meshed wire group 11 in this embodiment will be described.

Joining of the resin sheet 13 and the surface layer steel plate 5 or the meshed wire group 11 according to this embodiment may be joining by directly laminating the resin sheet 13 on the surface layer steel plate 5 or the meshed wire group 11 or joining by laminating an adhesive layer between the surface layer steel plate 5 or the meshed wire group 11 and the resin sheet 13. When the adhesive layer is laminated, the adhesive needs to have affinity with both the resin sheet 13 and the surface layer steel plate 5 or the meshed wire group 11. A criterion of the affinity of the adhesive with the resin sheet 13 is that a difference in solubility parameter between the adhesive and the resin sheet 13 is 6 MJ/m$^3$ or smaller. Alternatively, in the case of the resin sheet 13 having a polar group, a criterion is that a functional group (including a coupling group) capable of forming, with this polar group, chemical bonding such as covalent bonding, hydrogen bonding, ion interaction effect, coordinate bonding, or the like, or physical bonding or the like not accompanying movement of charges, is introduced into the adhesive. The solubility parameter can be estimated by a method of Fedors or Small or the like from a chemical structure or the like of a unit which it forms. The difference in solubility parameter between the adhesive and the resin sheet 13 is preferably 6 MJ/m$^3$ or smaller, more preferably 3 MJ/m$^3$ or smaller, still more preferably 2 MJ/m$^3$ or smaller. The smaller the difference in solubility parameter between the adhesive and the resin sheet 13, the more the compatibility between the both improves and initial adhesion improves.

On the other hand, appropriate adhesion between the practical resin sheet 13 and the adhesive can be evaluated by adhering two resin sheets 13 with an adhesive and measuring a T peeling strength. In this case, the T peeling strength is preferably 20 N/cm or higher, more preferably 30 N/cm or higher, still more preferably 45 N/cm or higher, yet more preferably 60 N/cm or higher. In addition, when the T peeling strength is less than 20 N/cm, the initial adhesion strength just after the surface layer steel plate 5 or the meshed wire group 11 is laminated is small, and delamination may occur in the interface between the resin sheet 13 and the adhesive during processing or heating after processing.

The practical affinity of the surface layer steel plate 5 or the meshed wire group 11 with the adhesive can be evaluated by a T peeling test (JIS Z 0238) of a test piece obtained by joining two surface layer steel plates 5 or two meshed wire groups 11 with an adhesive. The T-peeling strength in this case is preferably in a similar strength range between the resin sheet 13 and the adhesive. Specifically, similarly to the interface between the resin sheet 13 and the adhesive, the T peeling strength of 20 N/cm or higher is preferred. When the T peeling strength is less than 20 N/cm, the interface between the surface layer steel plate 5 (or the meshed wire group 11) and the adhesive hampers the adhesion, and delamination may occur during processing or heating of the laminated steel plate 1. Further, the T peeling strength of the surface layer steel plate 5 or the meshed wire group 11 with the adhesive is more preferably 30 N/cm or higher, still more preferably 45 N/cm or higher, yet more preferably 60 N/cm or higher.

Further, to retain the heat-resistant shape stability after being processed, a storage modulus G' of the adhesive at 100° C. to 160° C. is preferably 0.05 MPa or higher and 100 GPa or lower. When the laminated steel plate 1 is shaped, residual stress occurs in the interface between the surface layer steel plate 5 (or the meshed wire group 11) and the adhesive. When the shaped product of the laminated steel plate 1 is heated to the aforementioned temperature, if the storage modulus G' of the adhesive is less than 0.05 MPa, the adhesive layer creep deforms by this residual stress, which may lead to destruction of the adhesive layer or delamination beginning from the adhesive layer. From such a viewpoint, the storage modulus G' of the adhesive at 100° C. to 160° C. is more preferably 1.0 MPa or higher, still more preferably 5 MPa or higher. On the other hand, when the storage modulus G' of the adhesive is higher than 100 GPa, the storage modulus G' at room temperature becomes larger, and thus processing following ability decreases. Accordingly, there is a concern that the adhesive layer is destroyed when the laminated steel plate 1 is processed, or delamination starting from the adhesive layer easily occurs. In addition, the storage modulus G' of the adhesive can be evaluated by a largest value of the storage modulus of the adhesive measured at frequencies 0.1 Hz to 10 Hz. An adhesive film which is bridged and cured by adding the same thermal history as a laminating condition in the case of a thermosetting adhesive, or an adhesive film in the case of thermoplastic adhesive, can be measured by a publicly known dynamic viscosity measuring apparatus.

Furthermore, a ratio tan δ (=G"/G') between a loss modulus G" at the aforementioned temperature of the adhesive layer and the storage modulus G' is preferably tan δ<1, more preferably tan δ<0.8, still more preferably tan δ<0.5, yet more preferably tan δ<0.1. The smaller the tan δ, the more the creep deformation of the adhesive layer by the residual stress is suppressed when being heated and the shape can be stable. On the other hand, when tan δ≥1, the adhesive layer may viscously flow when the product is heated to the aforementioned temperature and cause an unstable shape, or creep deformation and destruction may occur and cause delamination.

Examples of the adhesive which can be used for the adhesive layer include thermosetting resin-based adhesives such as urea resin, melamine resin, phenol resin, resorcinol resin, epoxy resin, polyester base, polyurethane base, polyamide base, polybenzimidazole base, acrylate base, and the like, thermoplastic resin-based adhesives of vinyl acetate resin base, polyvinyl acetal base, ethylene-vinyl acetate-based resin base, vinyl chloride base, acrylic, acrylate resin base, polyamide base, cellulose base, polyester base, polyolefin base, and the like, natural adhesives of asphalt, natural rubber, protein, starch, and the like, elastomer-based adhesive of nitrile rubber, styrene-based rubber, polysulfide base, butyl rubber base, silicon rubber base, acrylic rubber base, modified silicon rubber base, urethane rubber base, sililation urethane rubber base, and the like, inorganic adhesives such as silane coupling agent of γ-glycidoxypropyltrimethoxysilane or β-(3,4-epoxycyclohexyl)ethyltrimethoxysilane, and the like and titanium coupling agent, and the like, which can be selected corresponding to the resin sheet 13. When the resin sheet 13 is polyamide-based resin or polyester-based resin, polyurethane-based, polyester-based, polyamide-based adhesives are preferred due to their affinity with both the resin sheet 13 and the surface layer steel plate 5 (or the meshed wire group 11). Furthermore, due to the heat resistance of the adhesive, a reactive hot-melt adhesive obtained by adding a cross-linking agent to these adhesive base materials is preferred. Among others, a polyester-based reactive hot-melt adhesive obtained by adding a cross-linking agent to a polyester-based adhesive base material is preferred particularly in the aspect of handling ability.

An example of the polyester base material which can be used for the reactive hot-melt adhesive is saturated polyester formed of a diol residue and a dicarboxylic acid residue, which are exemplified above. Among others, a copolymer polyester formed of plural diol residues or plural dicarboxylic acid residues or a combination of them is preferred because it reduces the crystallization degree and improves adhesiveness. Specifically, a polyester is preferred in which, with main components of 1,4-butadiol and a terephthalic acid residue, other diol residues or dicarboxylic acid residues are copolymerized. More specific examples include "Nylon" made by Toyobo, "Hardec" made by Asahi Kasei, "KEMIT" made by Toray, "Aron Melt PES" made by Toagosei, "Polyester" made by Nippon Synthetic Chemical Industry, and the like. Crystalline grades are preferred to amorphous grades in view of heat resistance.

Examples of the cross-linking agent which can be used for the reactive hot-melt adhesive include imidazole, isocyanate, epoxy resin, phenol novolac chemical compound, melamine compound, and the like. Among others, an isocyanate chemical compound is particularly preferred due to a cross-linking reaction speed controllability. The isocyanate chemical compound is an aromatic series or aliphatic series isocyanate chemical compound having two or more isocyanate functional groups and a mixture of them. Specifically, there are aromatic series isocyanate chemical compounds such as diphenylmethane diisocyanate compound (MDI), carbodiimide modified MDI, diphenylmethane 4,4-diisocyanate, diphenylmethane-2,2'-diisocyanate, diphenylmethane-2,4'-diisocyanate, oligomer phenylmethylene isocyanate (TDI), tetramethyl xylene diisocyanate (TMXDI), naphthylene diisocyanate, tryphenylmethane triisocyanate, and the like, aliphatic series diisocyanate such as isophoronediisocyanate, hexamethylene diisocyanate, hydrogenated aromatic diisocyanate, aliphatic polyisocyanate, alicyclic polyisocyanate, and the like, tryisocyanate, and polyisocyanate.

(Joining of the Meshed Wire Group and the Surface Layer Steel Plate)

Next, since the meshed wire group 11 and the surface layer steel plate 5 may be joined directly in this embodiment, the joining of the meshed wire group 11 and the surface layer steel plate 5 in this embodiment will be described. First, preferred adhesion between the meshed wire group 11 and the surface layer steel plate 5 can be evaluated by the peeling strength. The meshed wire group 11 and the surface layer steel plate 5 in this embodiment are preferably joined with the peeling strength of 5 N/cm or higher. When the peeling strength is less than 5 N/cm, the surface layer steel plates 5 on both faces of the core layer 10 become one body and do not deform during a bending deformation or a tensile deformation of the laminated steel plate 1, and there is a concern that the rigidity and shock resistance of the laminated steel plate 1 cannot be exhibited. To make a displacement of the surface layer steel plates of both the faces of the core layer 10 by shearing during a bending deformation of the laminated steel plate 1 small, the peeling strength is preferably 25 N/cm or higher, more preferably 40 N/cm or higher, still more preferably 60 N/cm or higher. In addition, the peeling strength can be evaluated by the T-peeling test of JIS Z0238.

In the case where the meshed wire group 11 is a wire mesh formed of steel wires, a publicly known joining method of steel materials can be applied to the joining method of the meshed wire group 11 and the surface layer steel plate 5. Specifically, for example, adhesion joining, braze joining, welding, or the like can be used.

When the meshed wire group 11 and the surface layer steel plate 5 are joined by adhesion, an adhesive is used as a joining material. At this time, to retain the heat-resistant shape stability after being processed, a storage modulus G' of the adhesive at 100° C. to 160° C. is preferably 0.05 MPa or higher and 100 GPa or lower. As described above, when the laminated steel plate 1 is shaped, residual stress occurs in the interface between the surface layer steel plate 5 (or the meshed wire group 11) and the adhesive. When a shaped product of the laminated steel plate 1 is heated to the aforementioned temperature (100° C. to 160° C.), if the storage modulus G' of the adhesive is less than 0.05 MPa, the adhesive layer creep deforms by this residual stress, which may lead to destruction of the adhesive layer or delamination beginning from the adhesive layer. To prevent creep deformation of the adhesive layer more securely, the storage modulus G' of the adhesive is more preferably 1.0 MPa or higher, still more preferably 5 MPa or higher. On the other hand, when the storage modulus G' of the adhesive is higher than 100 GPa, the storage modulus G' at room temperature becomes larger, and thus processing following ability decreases. Accordingly, there is a concern that the adhesive layer is destroyed when the laminated steel plate 1 is processed, or delamination starting from the adhesive layer easily occurs. In addition, the storage modulus G' of the adhesive can be evaluated by a largest value of the storage modulus of the adhesive measured at frequencies 0.1 Hz to 10 Hz. An adhesive film which is bridged and cured by adding the same thermal history as a laminating condition in the case of a thermosetting adhesive, or an adhesive film in the case of a thermoplastic adhesive, can be measured by a publicly known dynamic viscosity measuring apparatus.

Furthermore, a ratio tans (=G"/G') between a loss modulus G" at 100° C. to 160° C. of the adhesive layer and the storage modulus G' is preferably tan δ<1, more preferably tan δ<0.8, still more preferably tan δ<0.5, yet more preferably tan δ<0.1. The smaller the tan δ, the more the creep deformation of the adhesive layer by the residual stress is suppressed when being heated and the shape can be stable. On the other hand, when tan δ≥1, the adhesive layer may viscously flow when the product is heated to 100° C. to 160° C. and cause an unstable shape, or creep deformation and destruction may occur and cause delamination.

Specific examples of the adhesive which can be used as the joining material for the meshed wire group 11 and the surface layer steel plate 5 include ones similar to the above-described adhesives used for joining the resin sheet 13 and the surface layer steel plate 5 or the meshed wire group 11.

When the meshed wire group 11 and the surface layer steel plate 5 are joined by braze joining, a braze agent is used as the joining material. Examples of the braze material which can be used at this time include soft solders (solders) formed of an alloy of lead, tin, antimony, cadmium, zinc, and/or the like, hard solders such as Ni—Cr-based solder agent, copper solder, gold solder, palladium solder, silver solder, aluminum solder, and the like.

When the meshed wire group 11 and the surface layer steel plate 5 are joined by welding, a publicly known welding method can be used. Specific examples of the welding method include resistance welding such as spot-welding, seam welding, and the like, electron beam welding, laser welding, arc welding, and the like.

Further, when the meshed wire group 11 is a wire mesh formed of steel wires, it is necessary to keep an initial metal structure of steel wires, so as to retain the strength of the steel wires. From such a viewpoint, the joining temperature when joining the meshed wire group 11 and the surface layer steel plate 5 is preferably 400° C. or lower so that a phase transformation of the steel structure does not occur, more preferably 300° C. or lower, still more preferably 200° C. or lower, yet more preferably 100° C. or lower. Further, if it is possible to join the meshed wire group 11 and the surface layer steel plate 5 under 100° C., aging deterioration of the surface layer steel plate 5 can be prevented, and intense processing becomes easy.

(Thickness of the Laminated Steel Plate)

The thickness of the laminated steel plate 1 according to this embodiment is not particularly limited, and may be changed appropriately according to target characteristics. For example, when it is desired to give priority to rigidity and shock resistance as characteristics of the laminated steel plate 1, the thickness of the laminated steel plate 1 can be determined with above-described expression (3) or expression (4) or the like depending on the structure (wire diameter, opening, yield strength, and the like) of the meshed wire group 11 selected.

The total thickness and a structural thickness ratio (thickness ratio between the surface layer steel plate 5 and the core layer 10) of the laminated steel plate 1 according to this embodiment are not particularly limited and can be determined based on the balance between the thickness and rigidity D of the surface layer steel plate 5 and light-weightiness. Specifically, necessary thicknesses of the core layer 10 and the surface layer steel plate 5 can be determined from desired rigidity and plate density (steel plate specific gravity ρ) with following expressions (5) to (7).

$$D=\frac{1}{3}[(E_1-E_2)(y_1-y_e)^3+(E_2-E_3)(y_2-y_e)^3+E_1y_e^3+E_3(h-y_e)^3] \quad (5)$$

$$ye=[e_1-E_2)y_1^2+(E_2-E_3)y_2^2+E_3h^2]/[2((E_1-E_2)y_1+(E_2-E_3)y_2+E_3h)] \quad (6)$$

$$\rho=[7.8(h-y_2+y_1)+\rho_{core\ layer}(y_2-y_1)]/h \quad (7)$$

(In above expressions (5) to (7), $E_1$ is Young's modulus of the surface layer steel plate 5A on the lower face side, $E_2$ is Young's modulus of the core layer 10, $E_3$ is Young's modulus of the surface layer steel plate 5B on the upper face side, $y_1$ is thickness of the surface layer steel plate 5, $y_2$ is $y_1$+thickness of the core layer 10, $y_e$ is y-coordinate of a neutral axis, h is $y_2$+thickness of the surface layer steel plate 5A on the upper face side, and $\rho_{core\ layer}$ is core layer density.)

Further, a preferred thickness of the surface layer steel plate 5 is 0.2 mm to 2.0 mm, and a preferred thickness of the core layer 10 is 0.1 mm to 3.0 mm. When the thickness of the surface layer steel plate 5 is smaller than 0.2 mm, buckling may easily occur during bending. On the other hand, when the thickness of the surface layer steel plate 5 is larger than 2.0 mm, the weight reduction effect easily becomes insufficient. From a viewpoint of weight reduction, the thickness of the surface layer steel plate 5 is more preferably 1.0 mm or smaller. On the other hand, when the thickness of the core layer 10 is smaller than 0.1 mm, the total thickness of the laminated steel plate 1 cannot be earned, and thus it may be difficult to increase rigidity while maintaining light-weightness. Further, when the thickness of the core layer 10 is larger than 3.0 mm, the thickness of the laminated steel plate 1 itself becomes large, and thus bending stress applied to the surface layer steel plate 5 becomes large and buckling of the steel plates occurs easily.

Moreover, in the laminated steel plate 1 according to this embodiment, the core layer 10 may be laminated between surface layer steel plates 5 with a different thickness. Thus, the thick surface layer steel plate can be set as a portion with a large radius of curvature to be processed, so as to improve workability. Further, when the surface layer steel plate 5, the meshed wire group 11, and the resin sheet 13 are joined to each other with an adhesive, the thickness of the adhesive layer is not particularly limited because sufficient heat resistance and durability can be given to the adhesive layer when the storage modulus G' is 0.05 MPa or higher and 100 GPa or lower in the entire temperature range of 100° C. to 160° C., even if the thickness is made small. However, from a viewpoint of economic efficiency, the thickness of the adhesive layer is preferably 30 μm or smaller. Further, to sufficiently exhibit the effect of the adhesive layer, the thickness of the adhesive layer is more preferably 1 μm or larger.

[Production Method of the Laminated Steel Plate]

Next, a production method of the laminated steel plate 1 having the above-described structure will be described in detail.

The laminated steel plate 1 according to this embodiment can be produced by applying a publicly known steel plate laminating method. Specifically, it can be produced through the following processes, or the like.

(1) Steel wires having a carbon content of 0.24% by mass or more are used to produce the meshed wire group 11.

(2) A joining material (adhesive, braze agent, or the like) is applied as necessary on both faces of the core layer 10 (one or more meshed wire groups 11, one or more resin sheets 13). Then, when it is intended to form the core layer 10 having the structure illustrated in FIG. 1 for example, the surface layer steel plate 5A, the resin sheet 13, the meshed wire group 11, the resin sheet 13, the meshed wire group 11, the resin sheet 13, and the surface layer steel plate 5B are laminated in this order, and are compressed at room temperature or while being heated.

In addition, the structure of the core layer 10 is not limited to the example illustrated in FIG. 1, and may have a portion where meshed wire groups 11 or resin sheets 13 are laminated sequentially. Further, in the process of (2), the core layer 10 and the surface layer steel plates 5A, 5B may be joined directly without using the adhesive. Moreover, specific examples of the joining material and joining method are as described above.

[Second Embodiment]

Figure 6:
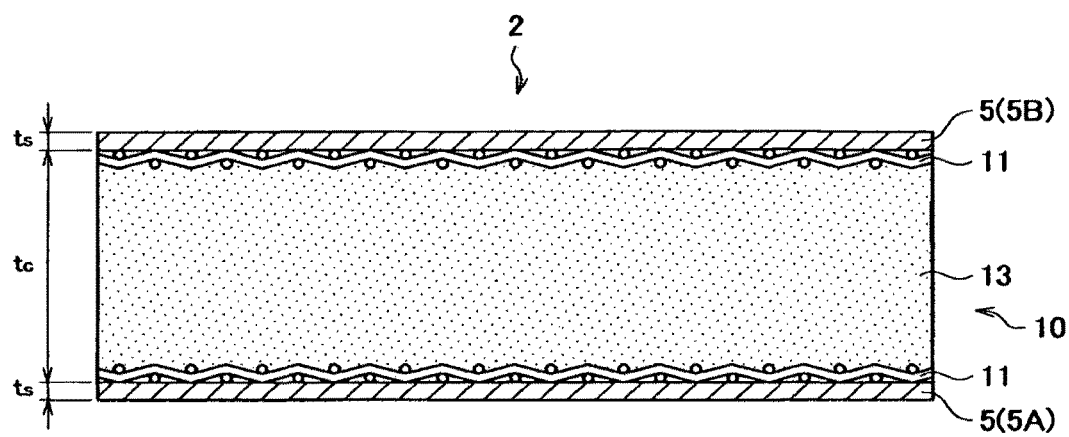
FIG. 6 is a cross-sectional view illustrating an example of the overall structure of a laminated steel plate according to a second embodiment of the present invention.

Next, the overall structure of the laminated steel plate according to a second embodiment of the present invention will be described with reference to FIG. 6. FIG. 6 is a cross-sectional view illustrating an example of the overall structure of a laminated steel plate 2 according to this embodiment.

As illustrated in FIG. 6, the laminated steel plate 2 according to this embodiment has a structure in which surface layer steel plates 5 (5A, 5B) are laminated respectively on both faces of the core layer 10, similarly to the laminated steel plate 1 according to the first embodiment. That is, the laminated steel plate 2 has a structure in which the core layer 10 is laminated on the surface layer steel plate 5A, and the surface layer steel plate 5B is further laminated thereon. Similarly to the first embodiment, the core layer 10 is a layer formed of one or more meshed wire groups 11 formed in a mesh form using wires and one or more resin sheets 13 in which a resin base material is formed in a sheet form. However, as illustrated in FIG. 6, the laminated steel plate 2 according to this embodiment differs from the first embodiment in that the meshed wire groups 11 are located close to the sides of the surface layer steel plate 5.

Although FIG. 6 illustrates an example in which the meshed wire groups 11 are joined directly to the surface layer steel plates 5, it is not always necessary to directly join the meshed wire groups 11 and the surface layer steel plates 5. A resin sheet thinner than the resin sheet 13 laminated between the two meshed wire groups 11 may be laminated in between the surface layer steel plates 5 and the meshed wire groups 11, and the meshed wire groups 11 may be located close to the sides of the surface layer steel plates 5 in the entire core layer 10. From a viewpoint of improving damping performance, adhesion and corrosion resistance, which are embedding effects of the meshed wire groups 11 by the above-described resin sheets 13, it is rather preferred that the surfacemost layer of the core layer 10 in contact with the surface layer steel plate 5 be formed of the resin sheet 13.

Further, although FIG. 6 illustrates an example in which the two meshed wire groups 11 are respectively located close to the sides of the surface layer steel plates 5A, 5B, it is not necessary that one each of the meshed wire groups 11 is located close to the sides of the surface layer steel plates 5A, 5B. Two or more meshed wire groups 11 may be laminated on one or both of the surface layer steel plates 5A, 5B. This case also includes the case where the resin sheet 13 is laminated between adjacent meshed wire groups 11.

By the meshed wire groups 11 thus located close to the sides of the surface layer steel plates 5 in the core layer 10, the distance between the neutral axis and the meshed wire group 11 when the laminated steel plate 2 is processed becomes large, and the rigidity and the shock resistance of the laminated steel plate 2 can be improved more efficiently. Therefore, as steel plates for applications in which rigidity and shock resistance are particularly demanded, it is preferred that the laminated steel plate 2 according to this embodiment be used.

In addition, the other structure and production method of the laminated steel plate 2 are similar to those in the above-described first embodiment, and thus detailed descriptions thereof are omitted.

[Third Embodiment]

Figure 7:
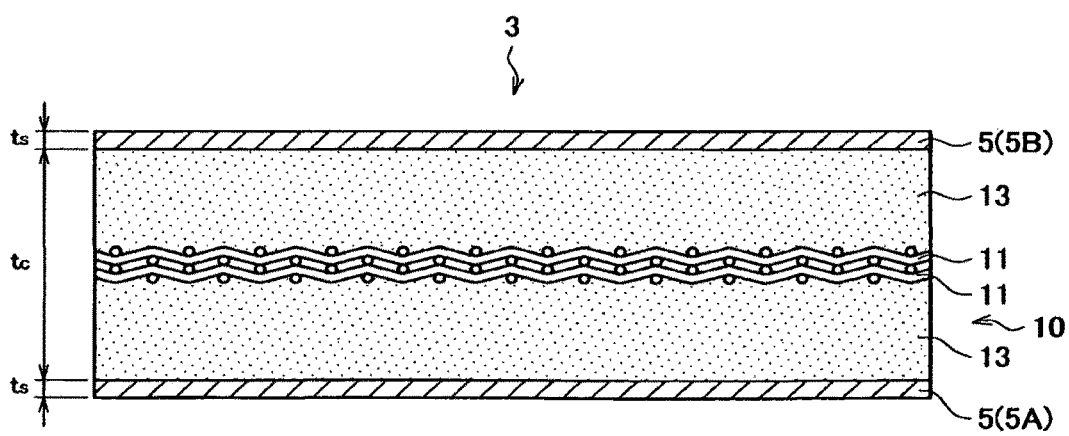
FIG. 7 is a cross-sectional view illustrating an example of the overall structure of a laminated steel plate according to a third embodiment of the present invention.

Next, the overall structure of a laminated steel plate according to a third embodiment of the present invention will be described with reference to FIG. 7. FIG. 7 is a cross-sectional view illustrating an example of the overall structure of a laminated steel plate 3 according to this embodiment.

As illustrated in FIG. 7, the laminated steel plate 3 according to this embodiment has a structure in which surface layer steel plates 5 (5A, 5B) are laminated respectively on both faces of the core layer 10, similarly to the laminated steel plate 1 according to the first embodiment. That is, the laminated steel plate 3 has a structure in which the core layer 10 is laminated on the surface layer steel plate 5A, and the surface layer steel plate 5B is further laminated thereon. Similarly to the first embodiment, the core layer 10 is a layer formed of one or more meshed wire groups 11 formed in a mesh form using wires and one or more resin sheets 13 in which a resin base material is formed in a sheet form.

However, as illustrated in FIG. 7, the laminated steel plate 3 according to this embodiment differs from the first embodiment in that the meshed wire groups 11 are located biasedly in a center portion side in the thickness direction of the core layer 10.

Although FIG. 7 illustrates an example in which the two meshed wire groups 11 are joined directly in the vicinity of the center portion in the thickness direction of the core layer 10, it is not always necessary to directly join the two meshed wire groups 11. A resin sheet thinner than the resin sheet 13 laminated between the two meshed wire groups 11 and the surface layer steel plate 5 (5A, 5B) may be laminated between the two meshed wire groups 11, and the two meshed wire groups 11 may be located biasedly in the center portion side in the thickness direction of the core layer 10 in the entire core layer 10.

Further, although FIG. 7 illustrates an example in which the two meshed wire groups 11 are located biasedly in the center portion side in the thickness direction of the core layer 10, the meshed wire groups 11 located biased in the center portion side in the thickness direction of the core layer 10 are not necessarily two. Three or more meshed wire groups 11 may be laminated in the center portion side in the thickness direction of the core layer 10.

This case also includes the case where the resin sheet 13 is laminated between adjacent meshed wire groups 11.

Thus, by the meshed wire groups 11 located biased in the center portion side in the thickness direction of the core layer 10, the neutral axis is no longer moved by shearing deformation of the core layer 10 even when it is bent and deformed. On the other hand, in the first and second embodiments described above, the center portion of the core layer 10 is not reinforced sufficiently by the meshed wire group 11, and thus the neutral axis moves inward of bending when it is bent and deformed during shearing deformation of the core layer 10, and the radius of curvature increases. In this point, in the laminated steel plate 3 according to this embodiment, compressive deformation and tensile deformation are possible and stress can be dispersed in a wide range as compared to the laminated steel plates 1, 2 according to the first and second embodiments.

Therefore, it is possible to improve ductility of the laminated steel plate 3 having the core layer 10 according to this embodiment. Thus, as steel plates for applications in which ductility is particularly demanded, the laminated steel plate 3 according to this embodiment is preferably used.

Figure 8A:
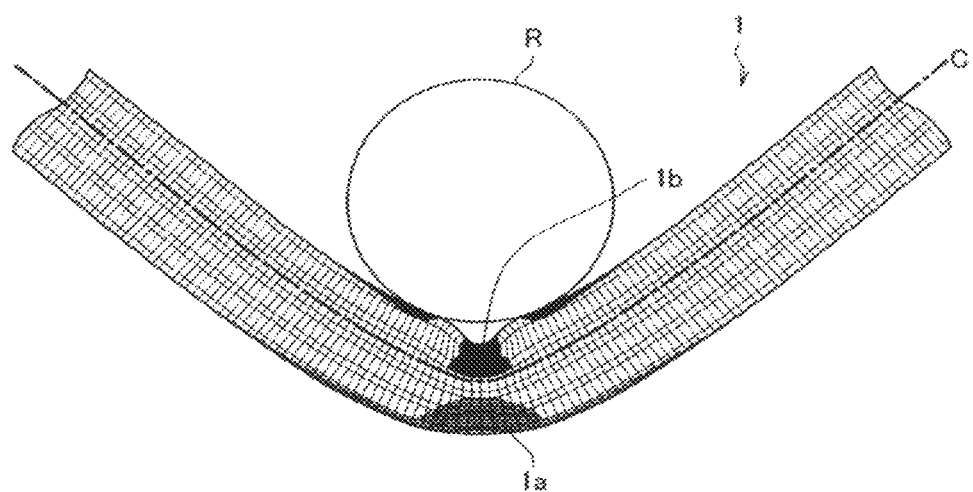
FIG. 8A is an explanatory view illustrating an example of a bending deformation behavior of the laminated steel plate according to the first embodiment of the present invention.
Figure 8B:
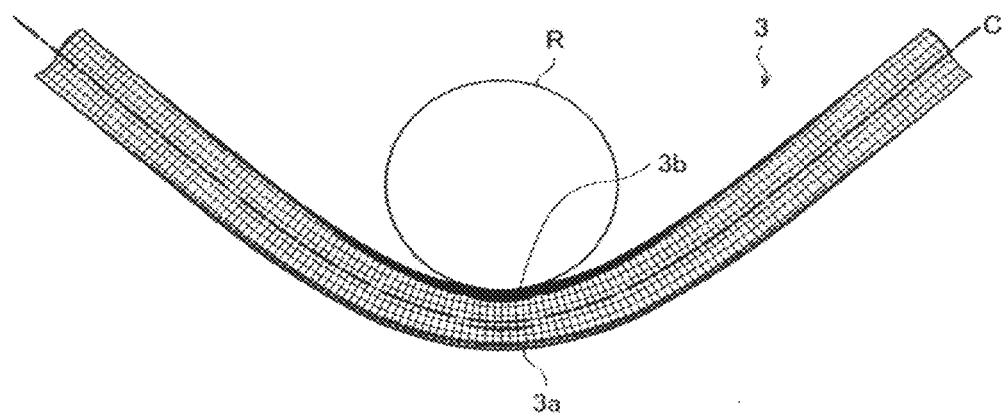
FIG. 8B is an explanatory view illustrating an example of a bending deformation behavior of the laminated steel plate according to the third embodiment of the present invention.

Here, the ductility improving effect by the laminated steel plate 3 according to this embodiment will be described in detail with reference to FIG. 8A and FIG. 8B. FIG. 8A and FIG. 8B are explanatory views illustrating an example of a difference in bending deformation behavior between the laminated steel plate according to the first embodiment and the laminated steel plate according to this embodiment of the present invention. FIG. 8A illustrates a bending deformation behavior of the laminated steel plate according to the first embodiment, and FIG. 8B illustrates a bending deformation behavior of the laminated steel plate according to the third embodiment.

First, as illustrated in FIG. 8A, for example, when the laminated steel plate 1 according to the first embodiment is bent using a roll R, the meshed wire group 11 larger in yield strength than the resin sheet 13 exists at a position relatively close to the surface layer steel plate 5. Accordingly, the neutral axis C moves inward (roll R side) rather than the center portion in the thickness direction of the laminated steel plate 1 during bending deformation, and thus the radius of curvature becomes large.

Further, when the laminated steel plate 1 is bent and deformed, a portion 1a where tensile stress is large and a portion 1b where compressive stress is large are concentrated in a narrow range. Therefore, fracture deflection of the laminated steel plate 1 is relatively small, and the ductility may become slightly insufficient in applications where the ductility is needed in particular, or the like.

On the other hand, as illustrated in FIG. 8B, for example, when the laminated steel plate 3 according to this embodiment is bent using the roll R, the meshed wire group 11 larger in yield strength than the resin sheet 13 exists at a position far from the surface layer steel plate 5. Accordingly, the neutral axis C does not move more inward (roll R side) than the center portion in the thickness direction of the laminated steel plate 1 during bending deformation, and the radius of curvature can be made small. Further, when the laminated steel plate 3 is bent and deformed, a portion 3a where tensile stress is large and a portion 3b where compressive stress is large can be dispersed in a wide range. Therefore, in the laminated steel plate 3 in which the meshed wire groups 11 are located biased in the center portion in the thickness direction of the core layer 10, fracture deflection can be increased, and the ductility can be improved more than the laminated steel plate 1.

In addition, the other structure and production method of the laminated steel plate 3 are similar to those in the above-described first embodiment, and thus detailed descriptions thereof are omitted.

[Summary]

The laminated steel plates according to the first to third embodiments of the present invention as described above are lightweight, highly rigid and shock resistant, and excel in workability and heat-resistant shape stability after being processed, even when being subjected to intense processing such as bending, deep drawing, or the like. Further, in the laminated steel plates according to the above-described embodiments, the core layer 10 has the resin sheet 13 other than the meshed wire group 11, and thereby even damping performance can be improved.

Therefore, the laminated steel plates according to the first to third embodiments of the present invention can be used for members for automobiles, home electric appliances, furniture, office automation apparatuses, and the like, and can be used preferably as steel plates particularly for sheet parts which are painted after being shaped by intense processing such as drawing, bending, profiling, or the like.

EXAMPLE

Hereinafter, the present invention will be described more specifically using examples.

(Steel plates, meshed wire groups, resin sheets which were used)

In this example and comparative examples, surface layer steel plates illustrated in Table 1, wire meshes (meshed wire groups) illustrated in Table 2, and resin sheets illustrated in Table 3 were used to produce laminated steel plates. Here, PET-based alloys in Table 3 are an alloy with a mass ratio of PET (RN163 made by Toyobo)/ionomer (Himilan 1706 made by Mitsui DuPont)/ethylene-based rubber (EBM2401P made by JSR) being 80 parts by mass/10 parts by mass/10 parts by mass. Further, for foams (foam sheets) used in this example and comparative examples illustrated in Table 3, a PET-based alloy and a nylon sheet were impregnated with supercritical $CO_2$ at 20 MPa and 32° C., thereafter the pressure was released, and they were foamed by heating to 260° C., 240° C. respectively. Then, after the heating, they were cooled to 0° C. to stop growth of bubbles, thereby obtaining the foam sheets illustrated in Table 3. In addition, by adjusting the impregnation time of the supercritical $CO_2$, heating time and cooling time, the foam ratios and bubble diameters of the foam sheets were controlled. Further, the "plain weave+45° " in "weave" of Table 2 denotes one in which oblique wires in a direction at 45° with respect to the directions of the vertical wires and horizontal wires are weaved into a plain weaved wire mesh.

TABLE 1

STRUCTURE OF SURFACE LAYER STEEL PLATE

| SURFACE LAYER STEEL PLATE | PLATING | THICKNESS (mm) | TENSILE STRENGTH (MPa) |
|---|---|---|---|
| 1 | GI | 0.27 | 340 |
| 2 | TFS | 0.22 | 400 |
| 3 | GA | 0.8 | 270 |
| 4 | SUS304 | 0.8 | 630 |
| 5 | GA | 1 | 1000 |

TABLE 2

STRUCTURE OF WIRE MESH

| | STEEL WIRE | | | WEAVE | | | | |
|---|---|---|---|---|---|---|---|---|
| CORE LAYER WIRE MESH | WIRE DIAMETER (μm) | [C] × $10^{-2}$ mass % | TENSILE STRENGTH MPa | OPENING* (μm) | THICKNESS (μm) | OPENING RATE (%) | PLATE DENSITY (g/cm$^2$) | WEAVE |
| 1 | 500 | 26 | 1000 | 2176 | 1000 | 66 | 0.2652 | PLAIN WEAVE |
| 2 | 300 | 75 | 2700 | 700 | 600 | 77 | 0.10764 | PLAIN WEAVE |
| 3 | 25 | 60 | 3000 | 85 | 50 | 60 | 0.0156 | PLAIN WEAVE |
| 4 | 100 | 75 | 2700 | 700 | 200 | 70 | 0.0468 | PLAIN WEAVE + 45° |
| 5 | 100 | 75 | 2700 | 700 | 200 | 77 | 0.03588 | PLAIN TWILL WEAVE |
| 6 | 100 | 75 | 2700 | 700 | 200 | 77 | 0.03588 | FLAT TOP |
| 7 | 500 | 26 | 1000 | 300 1500 | 1000 | 41 | 0.27612 | TON-CAP SCREEN |
| 8 | 500 | 26 | 1000 | 1500 | 1000 | 45 | 0.2145 | HEXAGONAL WIRE MESH |
| 9 | 25 | 60 | 3000 | 20 | 50 | 20 | 0.0312 | PLAIN WEAVE |

TABLE 2-continued

STRUCTURE OF WIRE MESH

| | STEEL WIRE | | | WEAVE | | | | |
|---|---|---|---|---|---|---|---|---|
| CORE LAYER WIRE MESH | WIRE DIAMETER (μm) | [C] × $10^{-2}$ mass % | TENSILE STRENGTH MPa | OPENING* (μm) | THICKNESS (μm) | OPENING RATE (%) | PLATE DENSITY (g/cm$^2$) | WEAVE |
| 10 | 500 | 20 | 600 | 2176 | 1000 | 66 | 0.2652 | PLAIN WEAVE |
| 11 | 500 | 26 | 3000 | 10000 | 1000 | 90 | 0.078 | PLAIN WEAVE |

*TOP-CAP SCREEN WEAVE: SHORT OPENING AND LONG OPENING DIMENSION(JIS G3533), HEXAGONAL WEAVE: NORMAL MESH DIMENSION(JIS G3554)

TABLE 3

STRUCTURE OF RESIN SHEET

| RESIN SHEET | RESIN BASE MATERIAL | EXPANSION RATIO | MEAN BUBBLE DIAMETER (μm) | DISTANCE BETWEEN MOST ADJACENT BUBBLES(μm) |
|---|---|---|---|---|
| 1 | PET-BASED ALLOY | NONE | | |
| 2 | PET-BASED ALLOY | TWO TIMES | 1 | 0.5 |
| 3 | 6-NYLON | TWO TIMES | 1.5 | 1 |
| 4 | PP | TWO TIMES | 1.5 | 1 |

(Production of Wire Meshes Embedded in Resin)

Next, wire meshes embedded in resins were obtained, in which the wire meshes illustrated in Table 2 were embedded in the resin sheets illustrated in Table 3. Specifically, first, an adhesive illustrated in Table 4 below was coated on one face of a resin sheet having a thickness which was 0.55 times that of the wire meshes. Then, the resin sheet was laminated on both faces of the wire meshes so that the face of the resin sheet on which the adhesive was coated contacts the wire mesh, which were pressure bonded at a predetermined temperature (260° C. when the resin sheet was the PET-based alloy or 240° C. when the resin sheet was the nylon) and a predetermined pressure (10 kgf/cm$^2$ to 40 kgf/cm$^2$ (0.98 MPa to 2.92 MPa)), thereby obtaining wire meshes No. 1 to 15 embedded in resin illustrated in Table 4 below. In addition, among the wire meshes No. 1 to No. 15 embedded in resin, for ones in which plural wire meshes were used, first, wire meshes embedded in resin were made, in which one wire mesh was embedded in a resin sheet as described above. Then, the adhesive was coated on surfaces of the obtained wire meshes embedded in resin, and the wire meshes embedded in resin were laminated so that respective adhesive-coated faces of the wire meshes embedded in resin contact one another, which were then heated and pressure bonded, thereby obtaining wire meshes embedded in resin in which plural wire meshes were laminated (No. 3 to No. 6, No. 9, No. 12) in which plural wire meshes were laminated.

TABLE 4

WIRE MESHES EMBEDDED IN RESIN

| WIRE MESHES EMBEDDED IN RESIN | WIRE MESH | | | | RESIN SHEET | | WIRE MESH EMBEDDED IN RESIN | |
|---|---|---|---|---|---|---|---|---|
| | WIRE MESH | NUMBER OF WIRE MESHES | THICKNESS (mm) | PLATE DENCITY (g/cm$^2$) | SHEET | PLATE DENCITY (g/cm$^2$) | THICKNESS (mm) | PLATE DENCITY (g/cm$^2$) |
| 1 | 1 | 1 | 1 | 0.27 | 2 | 0.06 | 1.07 | 0.3 |
| 2 | 2 | 1 | 0.6 | 0.11 | 2 | 0.04 | 0.642 | 0.1 |
| 3 | 3 | 10 | 0.5 | 0.16 | 2 | 0.03 | 0.535 | 0.2 |
| 4 | 4 | 5 | 1 | 0.18 | 2 | 0.06 | 1.07 | 0.2 |
| 5 | 5 | 5 | 1 | 0.18 | 2 | 0.06 | 1.07 | 0.2 |
| 6 | 6 | 5 | 1 | 0.18 | 2 | 0.06 | 1.07 | 0.2 |
| 7 | 7 | 1 | 1 | 0.28 | 2 | 0.06 | 1.07 | 0.3 |
| 8 | 8 | 1 | 1 | 0.21 | 2 | 0.06 | 1.07 | 0.3 |
| 9 | 9 | 10 | 0.5 | 0.31 | 2 | 0.03 | 0.535 | 0.3 |
| 10 | 1 | 1 | 1 | 0.27 | 1 | 0.14 | 1.07 | 0.4 |
| 11 | 1 | 1 | 1 | 0.27 | 3 | 0.06 | 1.07 | 0.3 |
| 12 | 3 | 10 LAMINATE ON EVERY 36° ROTATION | 0.5 | 0.16 | 2 | 0.03 | 0.535 | 0.2 |
| 13 | 10 | 1 | 1 | 0.27 | 2 | 0.06 | 1.07 | 0.3 |
| 14 | 11 | 1 | 1 | 0.08 | 2 | 0.06 | 1.07 | 0.1 |
| 15 | 1 | 1 | 1 | 0.27 | 4 | 0.05 | 0.04 | 0.3 |
| 16 | 3 | 10 | 0.5 | 0.16 | 2 | 0.10 | 2.15 | 0.3 |
| 17 | 3 | 10 | 0.5 | 0.16 | 2 | 0.10 | 2.15 | 0.3 |
| 18 | 3 | 10 | 0.5 | 0.16 | 2 | 0.10 | 2.15 | 0.3 |

TABLE 4-continued

WIRE MESHES EMBEDDED IN RESIN

| WIRE MESHES EMBEDDED IN RESIN | WIRE MESH | | | | RESIN SHEET | | WIRE MESH EMBEDDED IN RESIN | |
|---|---|---|---|---|---|---|---|---|
| | WIRE MESH | NUMBER OF WIRE MESHES | THICKNESS (mm) | PLATE DENCITY (g/cm²) | SHEET | PLATE DENCITY (g/cm²) | THICKNESS (mm) | PLATE DENCITY (g/cm²) |
| 19 | 4.5 | CENTER ONE OF 5 TOP AND BOTTOM: SIX OF 3 | 0.5 | 0.13 | 2 | 0.10 | 2.15 | 0.3 |

Further, other than the wire meshes No. 1 to No. 15 embedded in resin, a PET-based alloy foam sheet having a thickness of 150 μm and a wire mesh were laminated repeatedly in this order for ten layers. Moreover, the PET-based alloy foam sheet having a thickness of 150 μm was laminated on the top face (uppermost face), and they were subjected to thermocompression bonding under the above-described conditions, thereby obtaining a wire mesh No. 16 embedded in resin illustrated in Table 4. In the wire mesh No. 16 embedded in resin in this manner, the wire meshes were arranged evenly in the resin of the core layer.

Further, other than the wire meshes No. 1 to No 15 embedded in resin, five wire meshes were laminated on each of both faces of a PET-based alloy foam sheet having a thickness of 1350 μm with the adhesive illustrated in Table 5 being coated on both faces. Then, a PET-based allow having a thickness of 1500 μm was laminated on each of wire meshes on both faces, and they were subjected to thermocompression bonding under the above-described conditions, thereby obtaining a wire mesh No. 17 embedded in resin illustrated in Table 4. In the wire mesh No. 17 embedded in resin in this manner, the wire meshes were located close to the upper and lower surface portions (sides of the surface layer steel plates) of the resin layer in the core layer.

TABLE 5

COMPOSITION OF ADHESIVE LAYER

| | BASE MATERIAL | CURING AGENT | BASE MATERIAL/ CURING AGENT | G' | tan δ |
|---|---|---|---|---|---|
| ADHESIVE1 | PES314S30 | CORONATEL | 100/5 | 1~30 MPa | 0.3 |

G'(STORAGE MODULUS), tan δ IS DYNAMIC MEASUREMENT VALUE(10 Hz) AT 100° C. TO 160° C.

Furthermore, other than the wire meshes No. 1 to No. 15 embedded in resin, adjacent wire meshes were joined so as to have ten laminated wire meshes. Then, a PET-based alloy foam sheet having a thickness of 1100 μm was laminated on each of both an upper and a lower face of the laminated wire meshes, and they were subjected to thermocompression bonding under the above-described conditions, thereby obtaining a wire mesh No. 18 embedded in resin illustrated in Table 4. In the wire mesh No. 18 embedded in resin in this manner, the wire meshes were located biased in the center portion (center side in the thickness direction of the core layer) of the resin layer in the core layer.

In addition, in the wire meshes No. 1 to No. 18 embedded in resin, the respective laminated wire meshes or the wire meshes and resin sheets were joined using the adhesive illustrated in Table 5.

(Producing the Laminated Steel Plate)

As a specific production method of the laminated steel plate in this example, first, the adhesive illustrated in Table 5 was coated on one face of a steel plate 300 mm×300 mm illustrated in Table 1. Then, the steel plate, the wire mesh embedded in resin, and the steel plate were laminated in this order so that the adhesive contacts the wire mesh embedded in resin obtained as described above, thereby obtaining a laminated body. Next, it was heated to the predetermined temperature (260° C. when the resin sheet is the PET-based alloy or 240° C. when the resin sheet is the nylon). Then, a shim having a predetermined thickness was used to surround four faces of the laminated body, and it was subjected to thermocompression bonding for two minutes with compressive force of 10 kgf/cm² to 40 kgf/cm² (0.98 MPa to 2.92 MPa) and thereafter cooled to room temperature, thereby obtaining each laminated steel plate of the examples No. 1 to No. 25 illustrated in Table 6.

TABLE 6

| | | STRUCTURE OF LAMINATED STEEL PLATE | | | |
|---|---|---|---|---|---|
| | | CORE LAYER | | | |
| EXAMPLE | SURFACE LAYER STEEL PLATE | WIRE MESH EMBEDDED IN RESIN | THICKNESS (mm) | PLATE DENSITY (g/cm$^2$) | TOTAL THICKNESS (g/cm$^2$) |
| 1 | 1 | 1 | 1.07 | 0.33 | 1.61 |
| 2 | 1 | 2 | 0.64 | 0.15 | 1.182 |
| 3 | 1 | 3 | 0.54 | 0.19 | 1.075 |
| 4 | 1 | 4 | 1.07 | 0.24 | 1.61 |
| 5 | 1 | 5 | 1.07 | 0.24 | 1.61 |
| 6 | 1 | 6 | 1.07 | 0.24 | 1.61 |
| 7 | 1 | 7 | 1.07 | 0.34 | 1.61 |
| 8 | 1 | 8 | 1.07 | 0.28 | 1.61 |
| 9 | 1 | 9 | 0.54 | 0.34 | 1.075 |
| 10 | 1 | 10 | 1.07 | 0.40 | 1.61 |
| 11 | 1 | 11 | 1.07 | 0.33 | 1.61 |
| 12 | 1 | 12 | 0.54 | 0.19 | 1.08 |
| 13 | 1 | 4 | 0.54 | 0.19 | 1.075 |
| 14 | 2 | 1 | 1.07 | 0.33 | 1.43 |
| 15 | 3 | 1 | 1.07 | 0.33 | 2.67 |
| 16 | 4 | 1 | 1.07 | 0.33 | 2.67 |
| 17 | 5 | 1 | 1.07 | 0.33 | 3.07 |
| 18 | 4.5 | 1 | 1.07 | 0.33 | 2.87 |
| 19 | 1 | 15 | 1.07 | 0.33 | 1.61 |
| 20 | 1 | 1 | 1.07 | 0.33 | 1.61 |
| 21 | 1 | 12 | 0.54 | 0.19 | 1.08 |
| 22 | 1 | 16 | 2.15 | 0.29 | 2.69 |
| 23 | 1 | 17 | 2.15 | 0.29 | 2.69 |
| 24 | 1 | 18 | 2.15 | 0.29 | 2.69 |
| 25 | 1 | 19 | 0.54 | 0.15 | 1.075 |
| COMPARATIVE EXAMPLE 1 | 1 | WIRE MESH 1 | 1 | 0.27 | 1.54 |
| COMPARATIVE EXAMPLE 2 | 1 | PUNCH METAL EMBEDDED IN RESIN | 1.07 | 0.33 | 1.61 |
| COMPARATIVE EXAMPLE 3 | 1 | 13 | 1.1 | 0.33 | 1.64 |
| COMPARATIVE EXAMPLE 4 | 1 | 14 | 1.1 | 0.14 | 1.64 |
| COMPARATIVE EXAMPLE 5 | 1 | GLASS REINFORCED NYRON | 1.28 | 0.27 | 1.82 |
| COMPARATIVE EXAMPLE 6 | 1 | PET FORM BASED ALLOY | 1.35 | 0.27 | 1.89 |
| COMPARATIVE EXAMPLE 7 | 1 | PP FOAM | 1.07 | 0.33 | 1.61 |

Further, respective production methods of a laminated steel plate in comparative examples are as follows.

Comparative Example 1

After the adhesive illustrated in Table 3 was coated on both faces of the wire mesh No. 1 illustrated in Table 2, the surface layer steel plate No. 1 illustrated in Table 1 was laminated on both faces of this wire mesh, and they were subjected to thermocompression bonding under the same conditions as the example No. 1 illustrated in Table 6, thereby obtaining the laminated steel plate of comparative example No. 1.

Comparative Example 2

First, a high-strength steel plate having a plate thickness of 2.1 mm and a tensile strength of 980 MPa was punched to form circular holes with a diameter of 2.0 mm (opening rate 66%). Then, the processed plate after being punched was embedded in a PET-based alloy foam sheet similarly to the wire mesh No. 1 embedded in resin illustrated in Table 5. Thereafter, the laminated steel plate of comparative example No. 2 in which a processed plate embedded in the resin was core layer was obtained under the same conditions as the example No. 1.

Comparative Examples 3 to 4

A laminated steel plate of comparative example No. 3 in which the wire mesh No. 10 having a smallest carbon content was embedded was obtained by the same procedure as the example No. 1. Further, a laminated steel plate of comparative example No. 4 in which the wire mesh No. 11 having a largest opening was embedded was obtained by the same procedure as the example No. 1.

Comparative Examples 5 to 6

A nylon sheet containing glass fibers (with a thickness of 1.3 mm, a content of glass fibers 30% by mass, and a tensile strength of 34 MPa) was laminated between surface layer steel plates 1 similarly to the example No. 1, thereby obtaining a laminated steel plate of comparative example 5. Further, a PET-based alloy foam sheet was laminated between surface layer steel plates 1 similarly to the example 1, thereby obtaining a laminated steel plate of comparative example 6.

Comparative Example 7

A PP foam sheet having a thickness of 1 mm was used as a core layer, and an acid modified PP having a thickness of 0.05 mm was used as an adhesive, thereby obtaining a laminated steel plate of comparative example 7 by the same procedure as the example 1.

(Physical Properties, Processing/Damping Performance Test of the Laminated Steel Plates)

From each of the laminated steel plates of the examples obtained as described above, a test piece (25 mm×150 mm) was cut out according to ASTM D-790, and a distance between fulcrums was set to 50 mm and speed was set to 5 mm/min, so as to perform three-point bending test. At this time, in the examples No. 1 to No. 19 and No. 22 to No. 24, the test piece was cut out so that a longitudinal direction and a width direction of the test piece match a direction of tetragonal lattices of the lowest layer wire mesh. Further, in the examples No. 20 and No. 21, the test piece was cut out so that a longitudinal direction and a width direction of the test piece match a direction of diagonal lines of the tetragonal lattices of the lowest layer wire mesh.

Then, from each test piece, measured distortion—gradient δ of load curve (calculated using a load up to ⅓ of the maximum load) was substituted in expression (i), so as to calculate flexural rigidity D. Further, a bending moment M of a plastic region of the laminated steel plate was calculated with expression (ii). In addition, since it is known that the shock resistance of a steel plate is correlated with the bending moment of a plastic region, the bending moment of the plastic region calculated with expression (ii) was employed as an index for shock resistance.

$$\delta = P_e l^3 / 48D \qquad (i)$$

$$M = Pl/4b \qquad (ii)$$

Here, in above expression (i) and expression (ii), $P_e$ is measured value, P is measured maximum bending load, δ is distortion amount, l is distance between fulcrums, and b is test piece width.

Furthermore, a test piece of 125 mm×30 mm was cut out from the laminated steel plate of each example, and a U-shaped hat bending test piece was made with a square deep-drawing testing machine (r=100 mm, BHF (Blank Holder Force): 2 tons) of 20T Universal Testing Machine made by Erichsen.

Further, a test piece (25 mm×150 mm) was cut out from the laminated steel plate of the examples No. 1 to No. 24, and a loss coefficient at a second resonance frequency was measured by a cantilever resonance method complying with JIS-G-0602.

(Evaluations)

<1. Evaluation of Light-Weightness>

The plate density ρ of each of the laminated steel plates was calculated with expression (iii).

$$\rho = v_a \rho_a + v_s \rho_s \qquad (iii)$$

Here, in the above expression (iii), $v_a$ and $v_s$ are volume fractions of a wire mesh and a surface layer steel plate, respectively, and $\rho_a$ and $\rho_s$ are plate densities of the wire mesh and the surface layer steel plate, respectively. In addition, since the thickness of the adhesive layer is thin compared to the thickness of the entire laminated steel plate, the influence thereof was handled as ignorable.

Furthermore, from the rigidity D obtained with expression (i), a plate thickness $t_p$ in a single surface layer steel plate needed for exhibiting the same flexural rigidity as that of the laminated steel plate was calculated with expression (iv), and a mass $W_p$ per this unit area was obtained with expression (v). Light-weightness when the flexural rigidity is constant was evaluated with a ratio (W/$W_p$) between the mass W per unit area of the laminated steel plate and the mass $W_p$ per unit area of the steel plate of expression (v).

$$t_p = 12D/E_s \qquad (iv)$$

$$W_p = \rho_s t_p \qquad (v)$$

Here, in above expression (iv) and expression (v), $E_s$ is Young's modulus of the surface layer steel plate (180 GPa in this example), and $W_p$ is a mass per unit area of the steel plate having the same rigidity as the laminated steel plate.

<2. Evaluations of Flexural Rigidity and Shock Resistance>

The rigidity $D_p$ of a single steel plate having the same mass as the mass W per unit area of the laminated steel plate calculated with expression (v) was calculated with expression (vi). Further, a ratio (D/$D_p$) between the rigidity $D_p$ obtained with expression (vi) and the rigidity D of the laminated steel plate was calculated, and the rigidity of the laminated steel plate was evaluated. Here, when D/$D_p$>1, it was evaluated that the rigidity has increased reasonably as compared to the case of the single steel plate.

$$D_p = E_s/12(\rho/\rho_s)^3 \qquad (vi)$$

Similarly to the evaluation of flexural rigidity, a bending moment $M_p$ of the single steel plate of the mass per the same unit area was calculated with expression (vii) similarly to the evaluation of flexural rigidity, and the magnitude of shock resistance was evaluated with a ratio (M/$M_p$) between this bending moment $M_p$ of the single steel plate and the bending moment M of the plastic region of the laminated steel plate obtained with expression (ii). Here, when M/$M_p$>1, it was evaluated that the shock resistance has increased reasonably as compared to the case of the single steel plate.

$$M_p = T_s/4(\rho/\rho_s)^2 \qquad (vii)$$

Here, in above expression (vii), P is bending largest load, $T_s$ is tensile strength of a surface layer steel plate, l is distance between fulcrums, and b is test piece width. In addition, when $T_s$ differs between surface layer steel plates of both an upper and a lower face of the core layer, $T_s$ mean values of the surface layer steel plates of the both upper and the lower face were used as the tensile strength of the surface layer steel plates.

<3. Evaluation of Ductility>

Bending of the laminated steel plates of examples No. 22 to No. 24 was continued until they fracture, deflection amounts at the time of fracture were measured, and ductility of the laminated steel plates was evaluated using the measured deflection amounts.

Here, it was evaluated that the larger the deflection amount, the higher the ductility. In addition, the deflection amounts were measured with a movement distance of a load point.

<4. Evaluation of Processing Soundness>

A cross section of a hat bending test piece was observed visually and with a stereoscopic microscope, and the presence/absence of delamination of the surface layer steel plate, destruction or buckling of the surface layer steel plate and collapse into the core layer, damage of the core layer, and the presence/absence of buckling were examined. Here, it was evaluated that the processing soundness was excellent when there was no abnormality in all items. Further, the processed piece was placed in an oven heated at 180° C., retained for 30 minutes, and thereafter taken out of the oven and cooled to room temperature. Then, heated shape soundness such as delamination of the surface layer steel plate, destruction of the core layer, flow, and the like after the processing were evaluated. Here, it was evaluated that the heated shape soundness was excellent when there was no abnormality in all items.

<5. Evaluation of Damping Performance>

Based on the loss coefficient at a second resonant frequency measured as described above, damping performance of the laminated steel plates of the examples No. 1 to No. 24 was evaluated. Here, it was evaluated that the larger the loss coefficient, the more the damping performance was favorable.

(Evaluation Results)

Evaluation results of the above are illustrated in Table 7 below:

As illustrated in Table 7, the laminated steel plates of the examples No. 1 to No. 24 were $W/W_p<1.0$, and it was found that they had a small plate density compared to a steel plate having the same rigidity and excels in light-weightness. Moreover, the laminated steel plates of the examples No. 1 to No. 24 were $D/D_p>1.0$, $M/M_p>1.0$, and it was found that they had large flexural rigidity and bending moment in a plastic region compared to one with the same plate density, and hence have high rigidity and excellent shock resistance.

Moreover, the laminated steel plates of the examples No. 1 to No. 21 all had no delamination of the surface layer steel plates, destruction or buckling of the surface layer steel plates and collapse into the core layer, and destruction or buckling of the core layer during hat bending or heating after the bending, and it was found that they were able to retain soundness in processing or after post-processing heating.

TABLE 7

CHARACTERISTIC EVALUATION RESULTS

| EXAMPLE | PLATE MASS W (g/cm²) | W/WP | RIGIDITY D (Nmm²) | D/Dp | SHOCK RESISTANCE M | M/Mp | FRACTURE DEFLECTION (mm) | HAT BENDING PROCESSING | HEAT RESISTANCE AT 180° C. | LOSS FACTOR |
|---|---|---|---|---|---|---|---|---|---|---|
| 1 | 0.75 | 0.60 | 60614.5 | 4.56 | 208.57 | 2.66 | | ○ | ○ | 0.98 |
| 2 | 0.57 | 0.60 | 26458.8 | 4.60 | 140.83 | 3.14 | | ○ | ○ | 0.96 |
| 3 | 0.61 | 0.70 | 20881.3 | 2.93 | 139.00 | 2.69 | | ○ | ○ | 0.92 |
| 4 | 0.66 | 0.54 | 58035.8 | 6.28 | 275.84 | 4.48 | | ○ | ○ | 0.95 |
| 5 | 0.66 | 0.54 | 59603.8 | 6.45 | 288.72 | 4.69 | | ○ | ○ | 0.95 |
| 6 | 0.66 | 0.54 | 59603.8 | 6.45 | 248.79 | 4.04 | | ○ | ○ | 0.98 |
| 7 | 0.76 | 0.60 | 62911.5 | 4.53 | 248.79 | 3.08 | | ○ | ○ | 0.98 |
| 8 | 0.70 | 0.56 | 62543.9 | 5.80 | 387.89 | 5.69 | | ○ | ○ | 0.98 |
| 9 | 0.76 | 0.86 | 22157.5 | 1.57 | 117.18 | 1.43 | | ○ | ○ | 0.98 |
| 10 | 0.82 | 0.66 | 60614.5 | 3.44 | 208.57 | 2.20 | | ○ | ○ | 0.6 |
| 11 | 0.75 | 0.60 | 60614.5 | 4.56 | 305.89 | 3.90 | | ○ | ○ | 0.98 |
| 12 | 0.61 | 0.72 | 18861.9 | 2.65 | 144.28 | 2.79 | | ○ | ○ | 0.92 |
| 13 | 0.47 | 0.53 | 21698.1 | 6.68 | 174.36 | 4.84 | | ○ | ○ | 0.98 |
| 14 | 0.61 | 0.58 | 36257.6 | 5.08 | 165.66 | 2.72 | | ○ | ○ | 0.98 |
| 15 | 1.58 | 0.71 | 350401.7 | 2.83 | 573.75 | 2.08 | | ○ | ○ | 0.98 |
| 16 | 1.58 | 0.71 | 350401.7 | 2.83 | 1273.88 | 1.98 | | ○ | ○ | 0.98 |
| 17 | 1.89 | 0.73 | 543457.2 | 2.55 | 2739.66 | 2.34 | | ○ | ○ | 0.98 |
| 18 | 1.73 | 0.72 | 440213.6 | 2.68 | 1512.27 | 1.67 | | ○ | ○ | 0.98 |
| 19 | 0.75 | 0.60 | 60614.5 | 4.52 | 208.57 | 2.65 | | ○ | ○ | 0.98 |
| 20 | 0.75 | 0.64 | 50877.3 | 3.82 | 170.07 | 2.17 | | ○ | ○ | 0.98 |
| 21 | 0.61 | 0.72 | 18861.9 | 2.65 | 144.28 | 2.79 | | ○ | ○ | 0.92 |
| 22 | 0.71 | 0.39 | 193225.1 | 17.36 | 462.15 | 6.63 | 20 | ○ | ○ | 0.98 |
| 23 | 0.71 | 0.38 | 208441.4 | 18.72 | 982.18 | 14.10 | 18 | ○ | ○ | 0.98 |
| 24 | 0.71 | 0.40 | 180473.3 | 16.21 | 359.10 | 5.15 | 35 | ○ | ○ | 0.98 |
| 25 | 0.57 | 0.59 | 20881 | 2.93 | 139 | 2.69 | | ○ | ○ | 0.94 |
| COMPARATIVE EXAMPLE 1 | | | | | | | | △ | | x |
| COMPARATIVE EXAMPLE 2 | 0.75 | | 47898.7 | 3.60 | 180.26 | 2.30 | | ※1 | | 0.05 |
| COMPARATIVE EXAMPLE 3 | 0.75 | | 63652.6 | 4.75 | 156.62 | 1.99 | | | | |
| COMPARATIVE EXAMPLE 4 | | | | | | | | END FACE CRACK IN SURFACE LAYER STEEL PLATE | | |
| COMPARATIVE EXAMPLE 5 | | | | | 136.21 | | | | | |
| COMPARATIVE EXAMPLE 6 | | | | | 115.92 | | | | | |
| COMPARATIVE EXAMPLE 7 | | | | | | | | | ※2 | x |

※1 SURFACE LAYER STEEL PLATE PARTIALLY DELAMINATED OCCURRENCE RATE = 2/10
※2 END FACE RESIN LEAKAGE

Further, the laminated steel plates of the examples No. 1 to No. 24 all had a loss coefficient of 0.5 or higher, and it was found that they excelled in damping performance.

Further, the reason for that the rigidity D and the bending moment M of the example No. 20 were slightly small as compared to the example No. 1 can be speculated as follows. The example No. 1 had one layer of wire mesh containing steel wires disposed in parallel in the width direction of the surface layer steel plate, whereas the example No. 20 had no steel wire disposed in parallel in the width direction of the surface layer steel plate. The steel wires disposed in parallel in the width direction do not deform by a bending deformation load, and thus bind Poisson deformation of the surface layer steel plates.

As a result, a binding force of the surface layer steel plates occurred in the laminated steel plate of the example No. 1 containing the steel wires, and thus in the laminated steel plate of the example No. 1, conceivably, the Young's modulus and the yield strength increased further, and the rigidity D and the bending moment M increased. On the other hand, in the laminated steel plate of the example No. 2, since the diagonal line of lattices of the wire mesh matched the longitudinal direction and the width direction of the bending test piece, conceivably, the wire mesh shear deformed when the bending load was applied, and a displacement occurred between the surface layer steel plates of the both upper and lower faces. Thus, conceivably the rigidity D and the bending moment M became smaller than those of the laminated steel plate of the example No. 1.

Further, the rigidity D and the bending moment M of the laminated steel plate of the example No. 12 and the rigidity D and the bending moment M of the laminated steel plate of the example No. 21 became almost equal values. It is speculated that this is because the wire meshes were laminated with the laminating direction thereof being changed, and they became isotropic.

Further, the laminated steel plate of the example No. 23 was larger in rigidity D and bending moment M than the laminated steel plate of the example No. 22. Conceivably, this is because the wire meshes of the core layer were located close to the sides of the surface layer steel plates, and thus the distance between the wire meshes and the neutral axis became large, thereby increasing the rigidity D and the bending moment M more efficiently.

Furthermore, the laminated steel plate of the example No. 24 was larger in fracture deflection than the laminated steel plate of the example No. 22, and excelled in ductility. Conceivably, this is because the wire meshes having a large yield strength was arranged in a center portion, and thus the movement of the neutral axis could be prevented and the radius of curvature was made small. Actually, the radius of curvature of the bending test piece of the example No. 24 just before fracture was obtained by filming the bending deformation with a video camera, and image processing and calculating the shape of the test piece just before fracture, and it was equal to or less than ⅕ of the example No. 22.

Further, the laminated steel plate of the example No. 25 was mostly the same as the laminated steel plate of the example No. 3 in rigidity D, bending moment M, workability, heat-resistant shape stability, and damping performance, but had smaller plate density. It is speculated that this is a result of using the wire mesh No. 5 with a large opening instead of the wire mesh No. 3 in the center portion of the core layer where contributions of the rigidity D and the bending moment M were small, thereby increasing the rigidity D and the bending moment M efficiently and reducing the weight.

Further, in the laminated steel plate of the comparative example No. 1, delamination may occur in the interface between the surface layer steel plates and the wire meshes when subjected to hat bending, and it was inferior to the laminated steel plates of the examples No. 1 to No. 24 in adhesion between the surface layer steel plates and the core layer. In the laminated steel plates of the examples No. 1 to No. 24, since the wire meshes were embedded in the resin sheet, the surface layer steel plates and the core layer were in surface contact. In this point, in the laminated steel plate of the comparative example No. 1, the surface layer steel plates and the wire meshes were in line contact or point contact, and thus the contact area became small, which is speculated to be a cause of the above inferiority. Further, the loss coefficient of the laminated steel plate of the comparative example No. 1 was smaller than the loss coefficient of the laminated steel plates of the examples No. 1 to No. 24, and it was found that it was inferior also in damping performance.

Further, regarding the comparative example No. 2, the rigidity D and the bending moment M were evaluated by a bending test. As a result, the laminated steel plate of the comparative example No. 2 was the same as the example No. 1 in mass W, but was smaller in rigidity D and bending moment M. In the comparative example No. 2, the processed plate material which deformed according to a Poisson deformation during a bending deformation was used as the core layer, whereas the example No. 1 in which the present invention was applied uses the wire meshes as the core layer. Accordingly, a deformation of the core layer was separated from the Poisson deformation, and hence the binding force of the surface layer steel plates operates and the Young's modulus and the yield strength were increased. This effect is speculated to be a cause of the above result.

The rigidity D and the bending moment M of the laminated steel plate of the comparative example No. 3 were small as compared to those of the example No. 1. It is speculated that this is because the carbon content of the steel wires in the wire mesh No. 10 was less than 0.24% by mass, and the tensile strength of the core layer was insufficient.

Furthermore, in the laminated steel plate of the comparative example No. 4, by the hat bending, collapse into the core layer of the surface layer steel plates (biting of the surface layer steel plates into holes of the core layer) and cracking from the end portion of the surface layer steel plates occurred, and the processing soundness was not retained. It is speculated that this is because the opening of the wire mesh No. 11 was ten times the thickness of the surface layer steel plates, and stress concentration occurred in a portion located above holes in the surface layer steel plates.

Further, in the laminated steel plates of the comparative examples No. 5 to No. 6, the thickness of the entire laminated steel plates were designed so as to exhibit the bending moment in substantially the same plastic region as the example No. 1 with expression (viii), but in actual measurement, it was smaller than that of the example No. 1. As a result of analyzing the bending test pieces of the comparative examples No. 5 to No. 6, 70% of the core layer was resin in the laminated steel plate of the comparative example No. 5 and reinforcing fibers were not continuous, and thus the shearing deformation resistance was smaller than that of the example No. 1. It is speculated that, as a result, the shearing deformation of the core layer caused a displacement which was 1.5 mm at most (ten times that of the example No. 1) in the surface layer steel plates of the both upper and lower faces, and this displacement decreased the bending moment in the plastic region. Further, regarding the comparative example No. 6, in addition to that the resin part was only 50% of the core layer, no reinforcing fiber existed, and thus a displacement which was much larger than that of the comparative example No. 5 occurred. It is speculated that this displacement decreased the bending moment in the plastic region.

$$M(\text{example No. 1}) = \frac{1}{4}(T_s((t_s+t_c)^2 - t_c^2)) - T_c(t_c^2)) \qquad \text{(viii)}$$

Further, regarding the laminated steel plate of the comparative example No. 7, the heat-resistant shape stability of a hat bending processed product was evaluated. As a result, leakage of resin from a steel plate end portion occurred, and a shape defect occurred.

In the foregoing, the preferred embodiments of the present invention have been described with respect to the attached drawings, but it is needless to mention that the present invention is not limited to such examples. It is clear that a person skilled in the art is able to devise various variation examples and modification examples within the scope described in the claims, and it should be understood that such examples of course belong to the technical scope of the present invention.

INDUSTRIAL APPLICABILITY

According to the present invention, it is possible to provide a laminated steel plate which is lightweight, highly rigid and shock resistant, and also combines damping performance and workability for shearing, bending, deep-drawing, extending, and the like, as well as shape stability after being processed.

REFERENCE SIGNS LIST 1 laminated steel plate
5 (5A, 5B) (surface layer) steel plate
10 core layer
11 meshed wire group
13 resin sheet
111 vertical wire
113 horizontal wire
115 hole (mesh)
117 weave in oblique direction (wire)
$t_s$ thickness of a surface layer steel plate
$t_c$ thickness of a core layer
$w_L$, $w_H$ opening
p (mesh) pitch
d wire diameter

The invention claimed is:

1. A laminated steel plate, comprising:
a core layer including a wire group formed in a mesh form using wires and a resin sheet, and
steel plates joined respectively to both faces of the core layer,
wherein the wires have a tensile strength of 601 MPa or higher, and an opening of the wire group is equal to or less than ten times the thickness of the steel plates, and
wherein a thickness of the core layer is 0.1 mm to 3.0 mm, and a thickness of the steel plates is 0.2 mm to 2.0 mm.

2. The laminated steel plate according to claim 1, wherein the tensile strength of the wires is 1000 MPa or higher.

3. The laminated steel plate according to claim 1, wherein the opening of the wire group is equal to or less than 3.5 times the thickness of the steel plates.

4. The laminated steel plate according to claim 1, wherein the opening of the wire group is equal to or more than 0.1 times the thickness of the steel plates.

5. The laminated steel plate according to claim 3, wherein the opening of the wire group is equal to or more than 0.5 times and equal to or less than 1 times the thickness of the steel plates.

6. The laminated steel plate according to claim 1, wherein the core layer and the steel plates are joined with an adhesive,
a shearing adhesion strength of the adhesive and the steel plates is 30 N/cm$^2$ or higher, and
a storage modulus G' of the adhesive at 100° C. to 160° C. is 0.05 MPa or higher and 100 MPa or lower.

7. The laminated steel plate according to claim 1, wherein weaves are added to the wire group in an oblique direction with respect to vertical wires and horizontal wires.

8. The laminated steel plate according to claim 7, wherein the wire group is a square mesh, and
the oblique direction is a direction of 45° with respect to directions of the vertical wires and the horizontal wires.

9. The laminated steel plate according to claim 1, wherein the core layer is formed of the wire groups laminated in n (n is integer of 2 or larger) layers, and
the direction of the wires forming the wire groups of every layer is shifted in a certain direction by an angle of 360/3 n ° or more and 360/n° or less between the wire groups of adjacent layers, so as to laminate the wire groups of respective layers.

10. The laminated steel plate according to claim 9, wherein the core layer is formed of the wire groups laminated in 2 layers to 20 layers.

11. The laminated steel plate according to claim 1, wherein the core layer has three or more of the wire groups, and among adjacent two of the wire groups selected arbitrarily from three or more of the wire groups, the opening of the wire group disposed on a farther side with respect to a center position in a thickness direction of the core layer is smaller than the opening of the wire group disposed on a nearer side.

12. The laminated steel plate according to claim 1, wherein the core layer has a plurality of the wire groups, and the plurality of the wire groups are joined with each other by solid phase joining or weaving.

13. The laminated steel plate according to claim 1, wherein a base material of the resin sheet is a foam.

* * * * *